US012623472B2

(12) United States Patent
Tamari et al.

(10) Patent No.: US 12,623,472 B2
(45) Date of Patent: May 12, 2026

(54) PRINTING APPARATUS AND COMPUTER-READABLE STORAGE MEDIUM

(71) Applicant: CANON KABUSHIKI KAISHA, Tokyo (JP)

(72) Inventors: Kento Tamari, Saitama (JP); Masashi Ito, Tokyo (JP); Keisuke Arita, Tokyo (JP); Motoyuki Taguchi, Tokyo (JP); Sho Takahashi, Kanagawa (JP); Ryota Komatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 18/751,485

(22) Filed: Jun. 24, 2024

(65) Prior Publication Data

US 2025/0001774 A1 Jan. 2, 2025

(30) Foreign Application Priority Data

Jun. 30, 2023 (JP) ................................ 2023-108526

(51) Int. Cl.

| | |
|---|---|
| ***B41J 13/00*** | (2006.01) |
| ***B41J 11/00*** | (2006.01) |
| ***B41J 13/03*** | (2006.01) |
| ***B65H 7/12*** | (2006.01) |

(52) U.S. Cl.
CPC ......... *B41J 13/0027* (2013.01); *B41J 11/008* (2013.01); *B41J 13/03* (2013.01); *B65H 7/12* (2013.01); *B65H 2513/11* (2013.01); *B65H 2701/1311* (2013.01); *B65H 2701/1313* (2013.01)

(58) Field of Classification Search
CPC ...... B41J 13/0027; B41J 11/008; B41J 13/03; B41J 13/0009; B41J 13/0018; B65H 7/12; B65H 2513/11; B65H 2701/1311; B65H 2701/1313; B65H 29/00
USPC ............................................................ 347/14
See application file for complete search history.

(56) References Cited

FOREIGN PATENT DOCUMENTS

JP H06-56299 A 3/1994

OTHER PUBLICATIONS

Keisuke Arita et al., U.S. Appl. No. 18/627,497, filed Apr. 5, 2024.

*Primary Examiner* — Jason S Uhlenhake
*Assistant Examiner* — Alexander D Shenderov
(74) *Attorney, Agent, or Firm* — VENABLE LLP

(57) ABSTRACT

A printing apparatus, includes a control unit to perform first control of, while performing printing by a printing unit in a state in which a trailing end portion of a preceding print medium overlaps a leading end portion of a succeeding print medium, controlling a conveying unit to separate the preceding print medium and the succeeding print medium from each other and, in the first control, adjusts a conveyance amount by the conveying unit to allow a conveying speed by the conveying unit to meet a criterion and adjusts a driving range of a nozzle based on the adjusted conveyance amount.

11 Claims, 31 Drawing Sheets

| PRINT ORDER N | PAGE K | PAGE COUNT M |
|---|---|---|
| 1 | 1 | 1 |
| 2 | 2 | 2 |

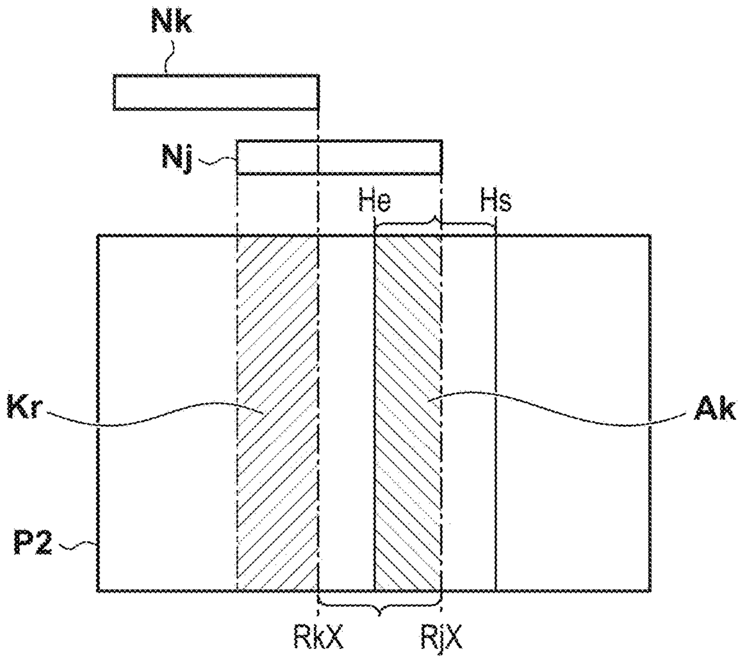
FIG. 31B
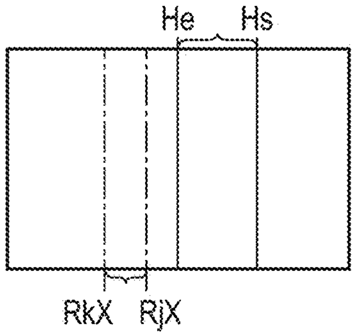
FIG. 31C
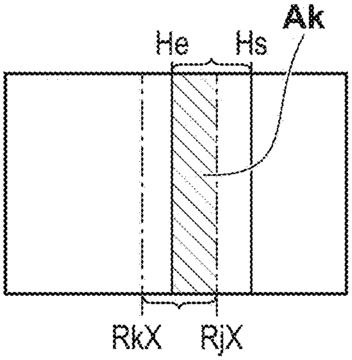
FIG. 31D
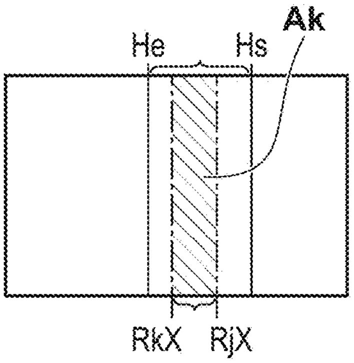
FIG. 31E
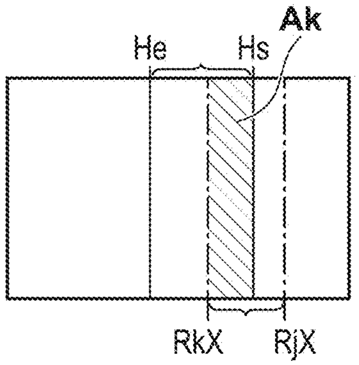
FIG. 31F
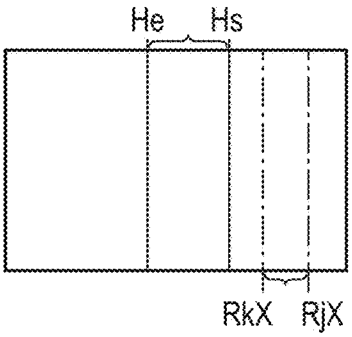
FIG. 31G
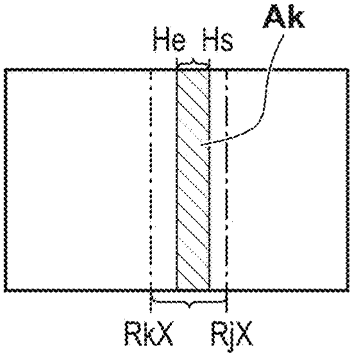

PRINTING APPARATUS AND COMPUTER-READABLE STORAGE MEDIUM

BACKGROUND OF THE INVENTION

Field of the Invention

The present invention mainly relates to a printing apparatus.

Description of the Related Art

Some of the printing apparatuses such as inkjet printers are configured to consecutively feed two or more sheet-like print media, sequentially perform printing on the print media, and convey the print media in an overlapping state during performing the printing (Japanese Patent Laid-Open No. 6-56299). Such a conveyance mode is also expressed as successive overlapped conveyance. This conveyance mode can improve the efficiency of printing processing.

In the above printing apparatus, the overlapping state of two or more print media is canceled (the print media are separated) and then sequentially output (discharged) from the apparatus main body. Such a separating operation is performed in the apparatus so that the order of the print media output from the apparatus main body is not changed. In order to implement the separating operation, the conveying speed of each print medium can be individually controlled.

SUMMARY OF THE INVENTION

The present invention improves control during separating print media.

One of the aspects of the present invention provides a printing apparatus comprising a conveying unit configured to convey a print medium, a printing unit including a printhead having a nozzle, and configured to perform scanning printing for performing printing on the print medium while scanning the printhead in a direction crossing a conveyance direction of the print medium, and a control unit configured to control the conveying unit and the printing unit so that conveyance of the print medium and scanning printing of the printhead are alternately performed, wherein the control unit performs first control of, while performing printing by the printing unit in a state in which a trailing end portion of a preceding print medium overlaps a leading end portion of a succeeding print medium, controlling the conveying unit to separate the preceding print medium and the succeeding print medium from each other and, in the first control, adjusts a conveyance amount by the conveying unit to allow a conveying speed by the conveying unit to meet a criterion and adjusts a driving range of the nozzle based on the adjusted conveyance amount.

Further features of the present invention will become apparent from the following description of exemplary embodiments (with reference to the attached drawings).

BRIEF DESCRIPTION OF THE DRAWINGS

FIGS. 31A to 31G are views showing some patterns to be referred to in the additional time calculation processing.

DESCRIPTION OF THE EMBODIMENTS

Figure 1:
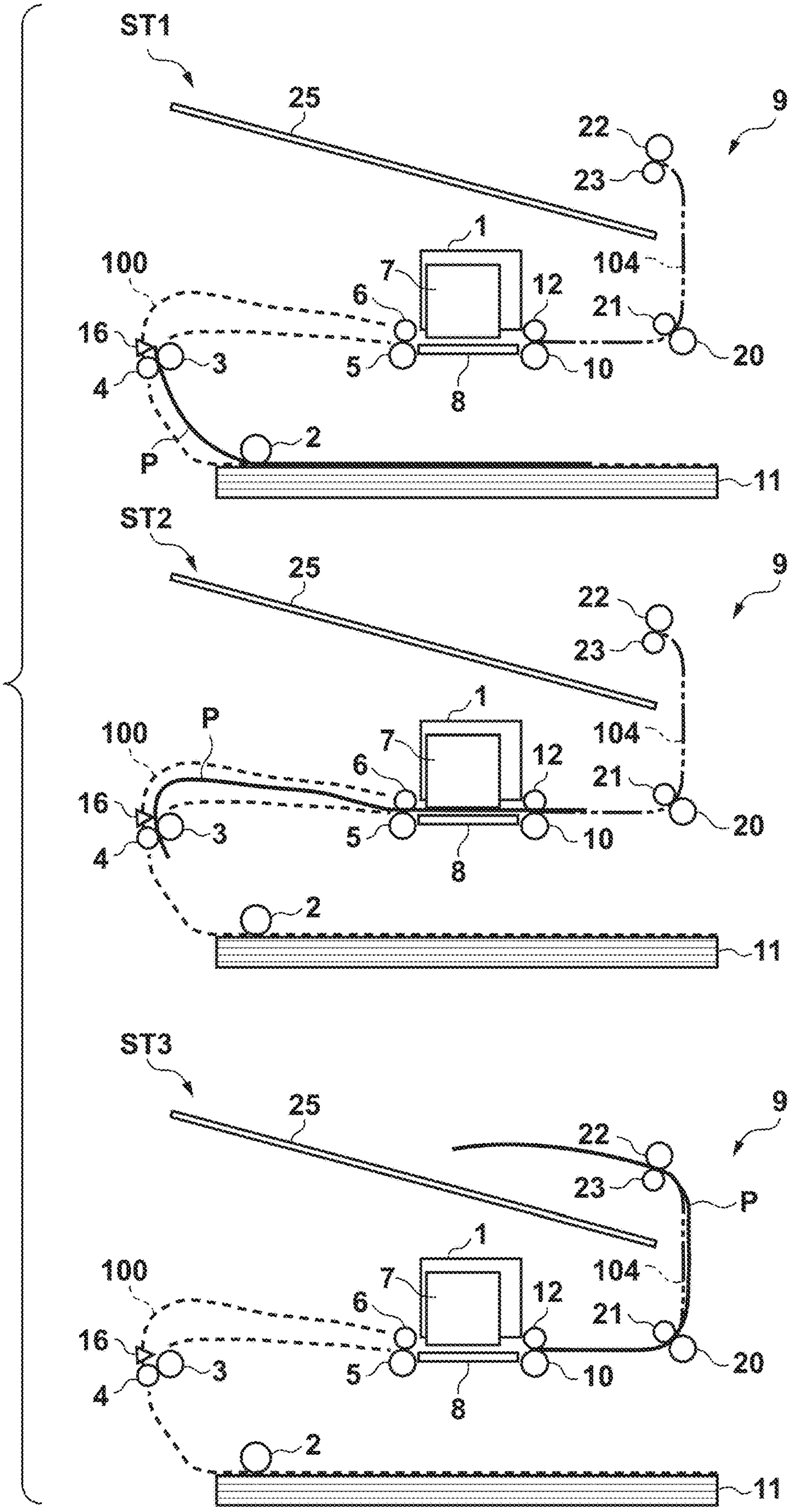
FIG. 1 is a schematic side view showing an example of the arrangement of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Overall Arrangement>

FIG. 1 is a schematic view for explaining an example of the arrangement of a printing apparatus 9 according to an embodiment. FIG. 1 exemplarily shows operation states ST1 to ST3 in the printing apparatus 9. The printing apparatus 9 includes a carriage 1, a printhead 7, a platen 8, a sheet stacking unit 11, a detection sensor 16, a paper discharge unit 25, and rollers 2 to 6, 10, 12, and 20 to 23.

In the state ST1, sheet-like print media P such as cut sheets are stacked on the sheet stacking unit 11. The roller 2 is a pickup roller that picks up the one print medium P by rotating in contact with the uppermost one of the plurality of print media P stacked on the sheet stacking unit 11. The roller 3 is a feed roller that feeds the picked-up print medium P to the downstream side in the conveyance direction along the inside of a conveyance path 100. The roller 4 is a driven roller that is biased against the feed roller 3 to feed the print medium P while holding the print medium P together with the feed roller 3.

The conveyance direction in this case indicates the conveyance direction of the print medium P. The side in the same direction as the conveyance direction of the print medium P is expressed as the downstream side, and the side opposite to the conveyance direction is expressed as the upstream side. For the sake of easy description, an end of the print medium P on the downstream side is expressed as a leading end, and a portion of the print medium P including the leading end is expressed as a leading end portion. Similarly, an end of the print medium P on the upstream side is expressed as a trailing end, and a portion of the print medium P including the trailing end is expressed as a trailing end portion.

A one-way roller is used as the pickup roller 2. When the picked-up print medium P reaches the position of the rollers 3 and 4, and the rollers 3 and 4 start to feed the print medium P, the driving of the pickup roller 2 may be stopped. In this case, the pickup roller 2 idles until the trailing end of the print medium P passes and can be inhibited from picking up the next print medium P.

The roller 5 is a conveyance roller that conveys the print medium P fed by the rollers 3 and 4 to a position facing the printhead 7. The roller 6 is a driven roller that is biased against the conveyance roller 5 to convey the print medium P while holding the print medium P together with the conveyance roller 5.

The rollers 3 and 4 described above form a feed nip portion. The rollers 5 and 6 form a conveyance nip portion. The print medium P is properly guided along a predetermined path in the conveyance path 100 between these nip portions. The detection sensor 16 is provided on the downstream side of the rollers 3 and 4 and can detect the conveyed print medium P (its leading end and trailing end).

In the state ST2, the printhead 7 performs printing on the print medium P conveyed by the rollers 5 and 6. In this embodiment, the printhead 7 is an inkjet head that can execute printing on the print medium P by causing a nozzle 71 (see FIG. 7A and the like) (to be described later) arrayed in a predetermined direction to discharge ink. The platen 8 is arranged to face the printhead 7 and supports the print medium P from the reverse surface of the print medium P (the surface on the opposite side to the printing surface).

The carriage 1 is equipped with the printhead 7 and causes the printhead 7 to scan in a direction crossing/substantially orthogonal to the conveyance direction (the crossing/substantially orthogonal direction will be referred to as a scanning direction). In such an arrangement, the printhead 7 is also expressed as a serial head, and the printing apparatus 9 can also be expressed as a serial printer.

The roller 10 is a conveyance roller that conveys, toward the roller 20, the print medium P on which printing has been performed by the printhead 7. The roller 12 is a driven roller that is biased against the conveyance roller 10 to convey the printed print medium P while holding the print medium P together with the conveyance roller 10.

In the state ST3, the printed print medium P is discharged to the paper discharge unit 25. The roller 20 is a conveyance roller that conveys the printed print medium P which is conveyed by the rollers 10 and 12. The roller 21 is a driven roller that is biased against the conveyance roller 20 to convey the printed print medium P while holding the print medium P together with the conveyance roller 21.

The roller 22 is a paper discharge roller that is arranged upstream of the paper discharge unit 25 and discharges, to the paper discharge unit 25, the printed print medium P which is conveyed from the conveyance roller 20 to a conveyance path (paper discharge path) 104. The roller 23 is a driven roller that is biased against the paper discharge roller 22 to discharge, to the paper discharge unit 25, the printed print medium P while holding the print medium P together with the paper discharge roller 22.

<System Configuration>

Figures 2, 3:
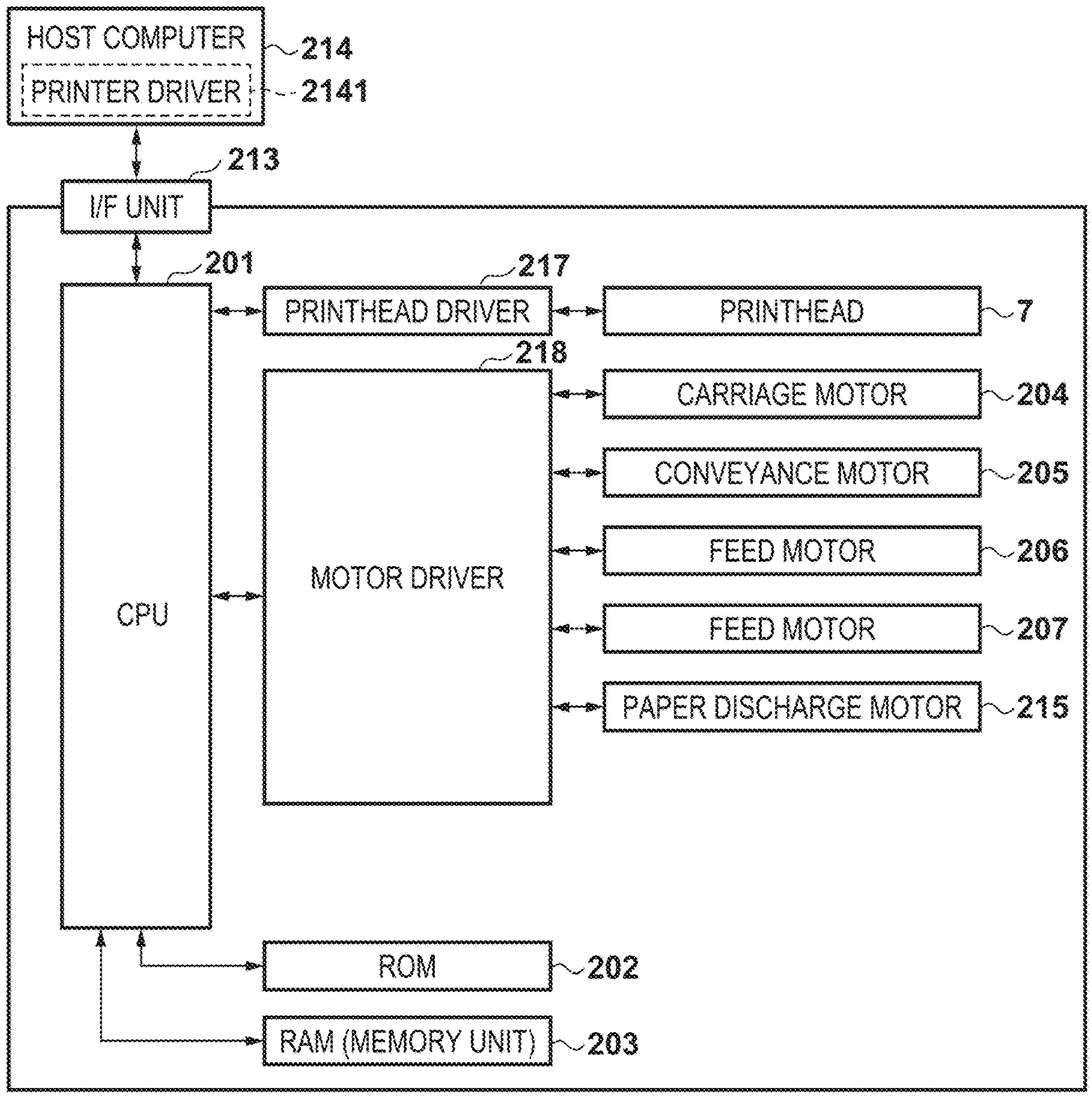
FIG. 2 is a block diagram showing an example of the system arrangement of the printing apparatus.
FIG. 3 is a view showing a mode of a printing order.

FIG. 2 is a block diagram showing an example of the system arrangement of the printing apparatus 9. The printing apparatus 9 further includes a CPU 201, a ROM 202, a RAM 203, and an interface (I/F) unit 213.

The central processing unit (CPU) 201 controls the operation of each element and performs arithmetic processing required for the control. Although described in detail later, the CPU 201 can control each roller described above to convey the two print media to be conveyed consecutively such that the trailing end portion of one preceding print medium overlaps the leading end portion of one succeeding print medium.

The read only memory (ROM) 202 holds information such as programs to be executed by the CPU 201 and data. The random access memory (RAM) 203 temporarily holds input data received from a host computer 214 via the I/F unit 213 and also temporarily holds the processed data obtained by arithmetic processing by the CPU 201.

The printing apparatus 9 further includes a printhead driver 217, a motor driver 218, and motors 204, 205, 206, 207, and 215. The motor driver 218 individually controls the motors 204, 205, 206, 207, and 215.

For example, the motor driver 218 drives the pickup roller 2 by performing drive control of the feed motor 206, and drives the feed roller 3 by performing drive control of the feed motor 207, thereby conveying the print medium P from the sheet stacking unit 11 to the printing position where the printhead 7 performs printing.

In response to the detection of the passage of the print medium P by the detection sensor 16, the motor driver 218 drives the conveyance rollers 5 and 10 by performing drive control of the conveyance motor 205 to move the print medium P relative to the printhead 7. During this movement, the motor driver 218 drives the carriage 1 by performing drive control of the carriage motor 204, thereby scanning the printhead 7. Together with this operation, the printhead driver 217 implements printing on the print medium P by performing drive control of the printhead 7.

Subsequently, the motor driver 218 drives the conveyance roller 20 and the paper discharge roller 22 by performing drive control of the paper discharge motor 215, thereby discharging the printed print medium P to the paper discharge unit 25.

This embodiment, in which the printhead 7 is a serial head, is configured to alternately repeat the operation (intermittent conveying operation) of intermittently conveying the print medium P with the conveyance roller 5 by a predetermined amount at a time and the operation (scanning printing operation) of discharging ink from the printhead 7 while scanning the printhead 7 with the carriage 1 between intermittent conveyances (that is, during the inhibition of the conveyance of the print medium P). With this operation, printing is performed on the print medium P. Note that scanning printing can also be called printing scan or the like.

In this case, other rollers (not shown) can be driven in the same manner by the motor driver 218 and the corresponding motors.

The host computer 214 includes a printer driver 2141 for communicating with the printing apparatus 9. Upon receiving an operation input for instructing the execution of printing from the user, the host computer 214 outputs data indicating a print image as a print job together with print information indicating its quality or the like. In the printing apparatus 9, the CPU 201 performs arithmetic processing upon receiving a print job via the I/F unit 213 and controls the drivers 217 and 218 based on the processing result.

<Printing Operation Accompanying Successive Overlapped Conveyance>

The following case will exemplify a printing operation when one print job includes two-page print data respectively corresponding to the two sheets of the print media P, as in FIG. 1.

FIG. 3 shows a mode of a printing order. Parameters in FIG. 3 indicate a printing order N, a page K in print data, and a page count M of print media. That is, in the example shown in FIG. 3, printing based on the first-page print data is performed on the first print medium P, and then printing based on the second-page print data is performed on the second print medium P. Note that the printing order in this case is set according to a scheme of discharging the print medium P in a posture in which the obverse surface (printing surface) faces down, that is, the so-called face down scheme, and is not limited to this case.

Figure 4:
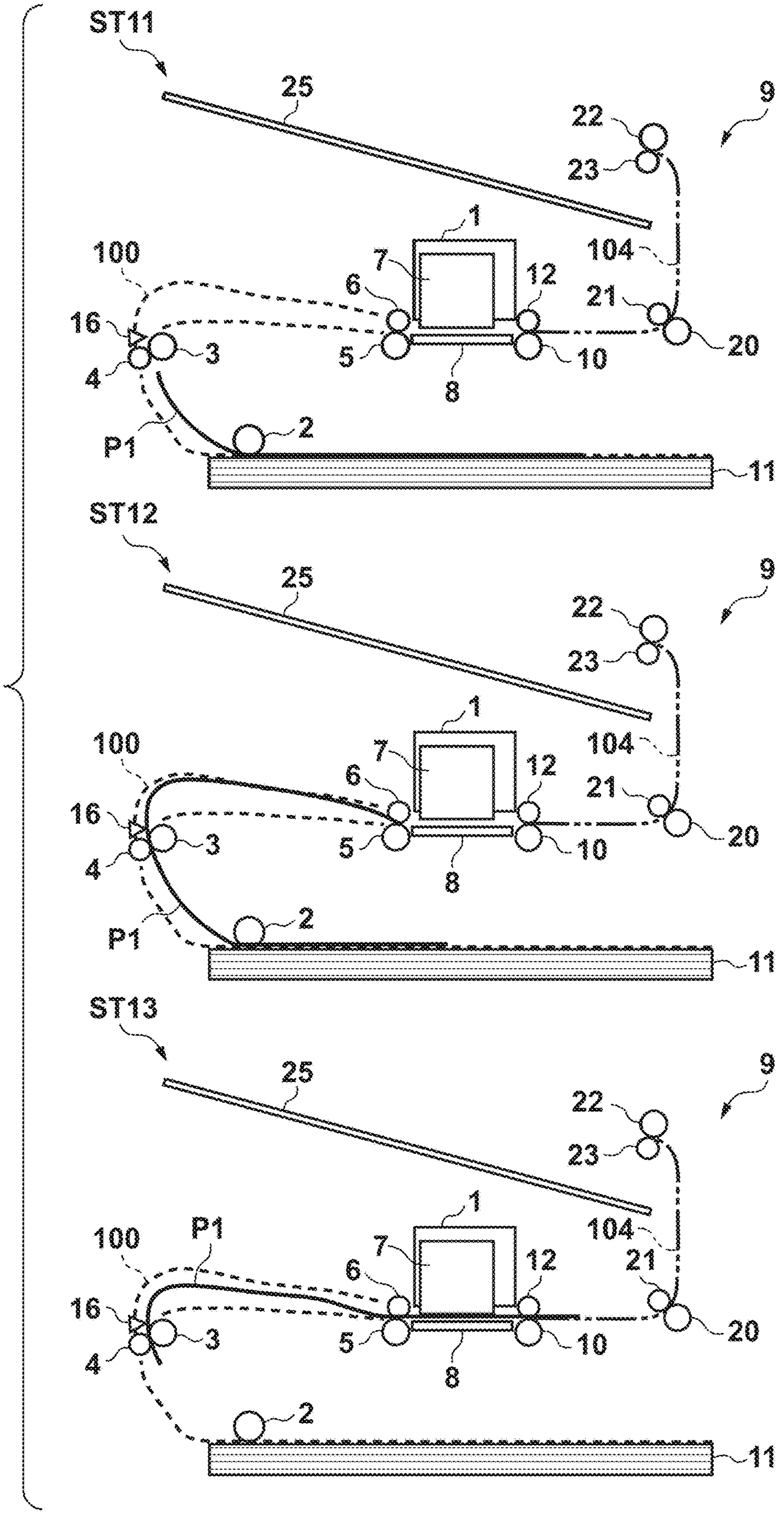
FIG. 4 is a schematic side view showing an example of the printing apparatus in each state.

As shown in FIG. 4, first of all, the feed motor 206 is driven at a relatively low speed to rotate the pickup roller 2 at 7.6 inches/sec (state ST11). The pickup roller 2 is rotated to pick up one uppermost sheet of the plurality of print media P (to be referred to as a first print medium P1) stacked on the sheet stacking unit 11. The feed roller 3 is driven by the feed motor 207 to rotate at substantially the same speed as that of the pickup roller 2 in the same direction, and the picked-up print medium P1 is then conveyed by the feed roller 3.

For the sake of easy description, the driving mode or the conveyance mode (driving at 7.6 inches/sec) at this time will be expressed as low-speed driving or low-speed conveyance hereinafter.

As described above, a one-way roller is used as the pickup roller 2. After the pickup roller 2 rotates until the print medium P1 passes through the feed roller 3, the pickup roller 2 idles by inhibition of the driving. Thereafter, the print medium P1 is continuously conveyed by the feed roller 3.

The detection sensor 16 detects the print medium P1 conveyed in this manner. When the detection sensor 16 detects the leading end of the print medium P1, the driving mode of the feed motor 207 is switched to drive the feed motor 207 at a relatively high speed, thereby rotating the feed roller 3 at 20 inches/sec.

For the sake of easy description, the driving mode or the conveyance mode (driving at 20 inches/sec) at this time will be expressed as high-speed driving or high-speed conveyance hereinafter.

Subsequently, the feed roller 3 continues to rotate, and the leading end of the print medium P1 abuts against the conveyance nip portion formed by the rollers 5 and 6 (state ST12). At this time, the conveyance roller 5 is set in a halt state/non-driven state. After the leading end of the print medium P1 abuts against the conveyance nip portion formed by the rollers 5 and 6, the feed roller 3 rotates by a predetermined amount to align the print medium P1 while its leading end abuts against the conveyance nip portion, thereby correcting the skew of the print medium (skew correcting operation).

After the skew correcting operation for the print medium P1 is completed, the conveyance motor 205 is driven to start rotating the conveyance roller 5. This causes the conveyance roller 5 to convey the print medium P1 at 15 inches/sec (state ST13). After the print medium P1 reaches a printing operation start position at which the print medium P1 faces the printhead 7, the printhead 7 starts printing based on print data on the print medium P1.

Note that the operation of adjusting the print medium P1 at the printing operation start position is performed by positioning the print medium P1 by causing the leading end of the print medium P1 to abut against the conveyance nip portion (the rollers 5 and 6) using the conveyance roller 5 and then rotating the conveyance roller 5 by a predetermined amount with reference to the position of the print medium P1.

When the print medium P1 is adjusted to the printing operation start position, the feed motor 207 is switched to low-speed driving, thereby rotating the feed roller 3 at 7.6 inches/sec. During the execution of the printing operation, the print medium P1 is intermittently conveyed. During this period, the conveyance roller 5 is intermittently driven. The feed motor 207 intermittently drives the feed roller 3 in synchronism with this driving. At this time, the driving forces of the rollers 3 and 5 are adjusted to set the print medium P1 in a pulled state between the rollers 3 and 5. With this adjustment, the rotational speed (rotation amount) of the feed roller 3 in the absence of the print medium P1 is lower than that of the conveyance roller 5. Accordingly, the feed roller 3 is rotated by the conveyance roller 5 through the print medium P1. That is, the feed roller 3 rotates at the same rotational speed as that of the conveyance roller 5.

Note that while the print medium P1 is intermittently conveyed, the paper discharge motor 215 intermittently drives the conveyance roller 20 like the conveyance roller 5.

Figure 5:
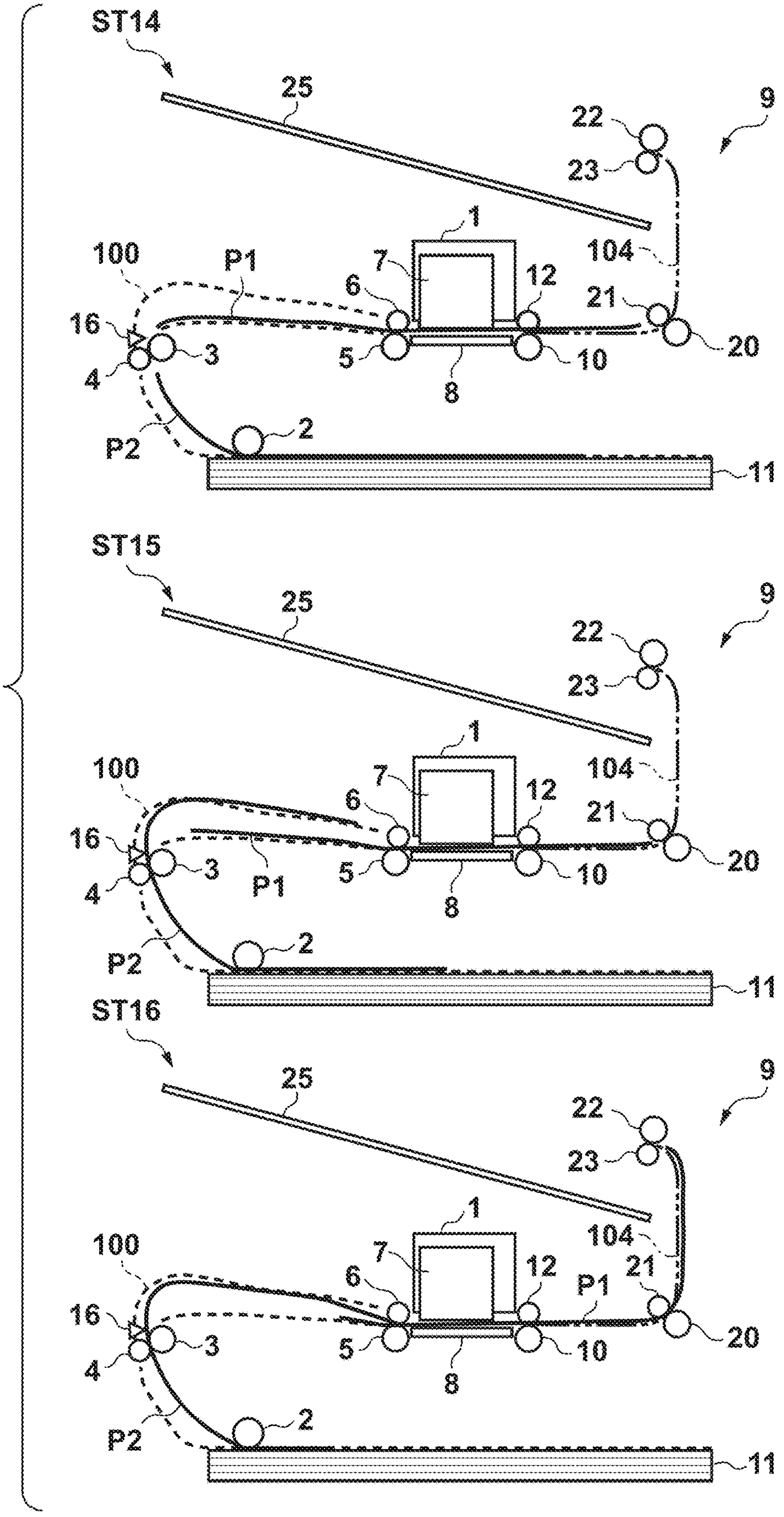
FIG. 5 is a schematic side view showing an example of the printing apparatus in each state.

As shown in FIG. 5, subsequently, like the preceding print medium P1, the succeeding print medium P (a second print medium P2) is picked up by the pickup roller 2 and then conveyed by the feed roller 3 (state ST14). In this state, the printhead 7 is performing printing on the print medium P1. When the detection sensor 16 detects the leading end of the print medium P2, the feed motor 207 is switched to high-speed driving to rotate the feed roller 3 at 20 inches/sec.

In this case, in order to allow the detection sensor 16 to properly detect an end portion of each print medium P, in consideration of the responsiveness and the like of the detection sensor 16, a predetermined interval is required between the two print media P conveyed consecutively. Accordingly, in order to allow the detection sensor 16 to detect the leading end of the succeeding print medium P2 after detecting the trailing end of the print medium P1, an interval corresponding to the time responsiveness of the detection sensor 16 can be provided between the trailing end of the print medium P1 and the leading end of the succeeding print medium P2.

In this embodiment, the print medium P2 can be picked up in response to the detection of the passage of the trailing end of the print medium P1 through the detection sensor 16. The pickup roller 2 can be controlled to form an interval equal to or larger than a predetermined distance between the trailing end of the print medium P1 and the leading end of the print medium P2.

After state ST14, the print medium P2 is conveyed at a speed higher than that of the printed print medium P1 by the printhead 7 conveyed downstream (the speed of the print medium P1 currently conveyed; the same applies below) (state ST15). This causes the leading end of the print medium P2 to overlap above the trailing end of the print medium P1. Continuously driving the feed roller 3 at a rotational speed of 20 inches/sec in response to the detection of the leading end of the print medium P2 by the detection sensor 16 will cause the leading end of the print medium P2 to catch up the trailing end of the print medium P1. The print medium P2 is conveyed by the feed roller 3 until the leading end of the print medium P2 reaches a predetermined position on the upstream side of the conveyance nip portion (the rollers 5 and 6). The position of the leading end of the print medium P2 can be calculated from the rotation amount of the feed roller 3 from the time when the leading end of the print medium P2 is detected by the detection sensor 16. The feed roller 3 is controlled based on the calculation result.

Subsequently, while the conveyance roller 5 is stopped to perform the last scanning printing of the printhead 7 on the print medium P1 (which can be expressed as the printing of the last line, the image formation of the last line, or the like), the feed roller 3 is driven to cause the leading end of the print medium P2 to abut against the conveyance nip portion, thereby correcting the skew of the print medium P2 (state ST16).

Here, after the last scanning printing of the printhead 7 on the print medium P1, a separating operation for separating the print medium P1 and the print medium P2 is performed. Hence, during the last scanning printing on the print medium P1, a predetermined preparation operation prior to the separating operation can be performed. The details will be described later as a nozzle shift operation.

Figure 6:
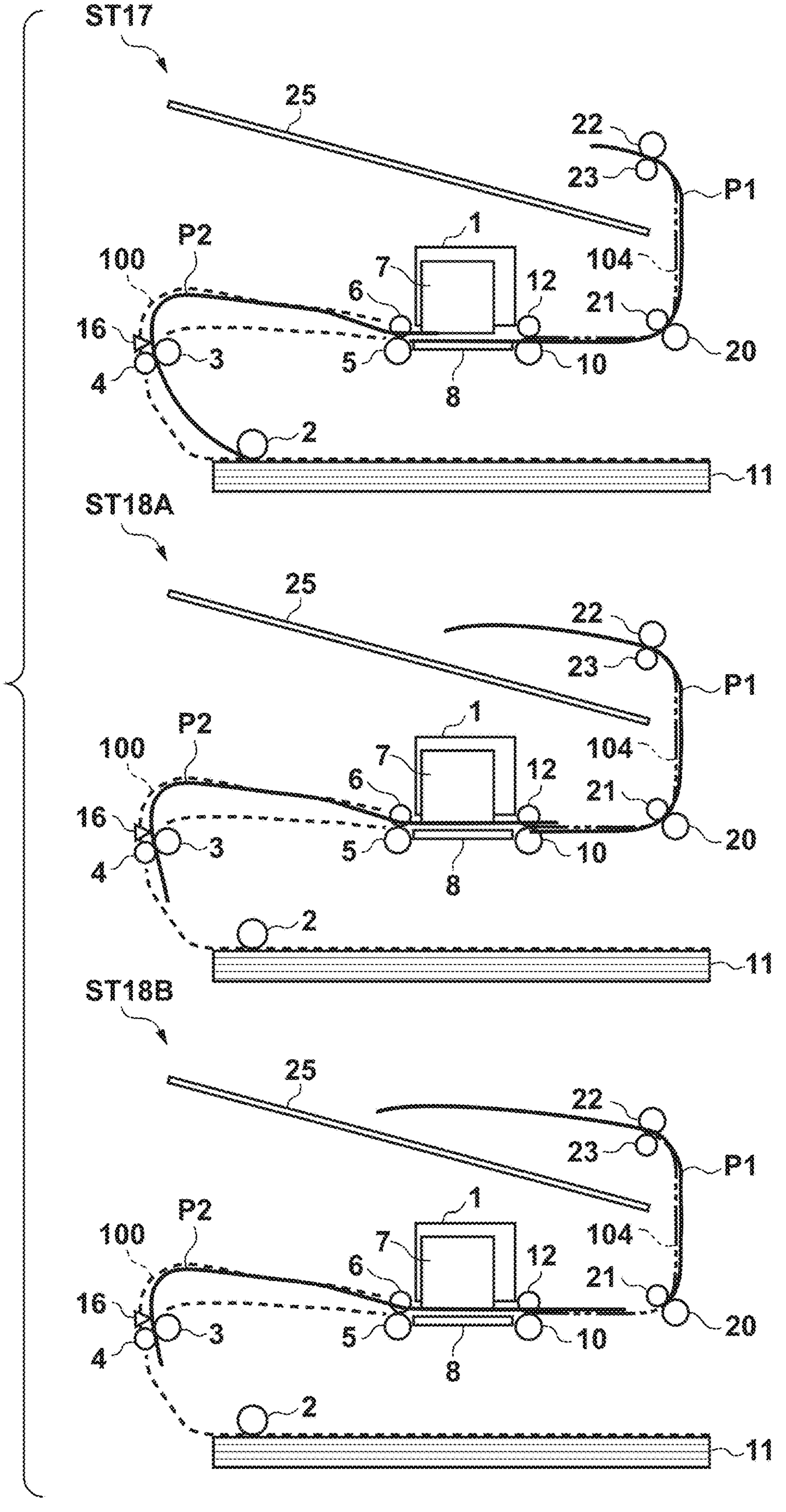
FIG. 6 is a schematic side view showing an example of the printing apparatus in each state.

As shown in FIG. 6, in response to the completion of the last scanning printing of the printhead 7 on the print medium P1, the conveyance roller 5 is rotated by a predetermined amount (state ST17). This will adjust the print medium P2 at the printing operation start position while maintaining the state in which the print medium P2 overlaps the print medium P1.

When the print medium P2 is adjusted at the printing operation start position, the feed motor 207 is switched to low-speed driving as in a printing operation for the print medium P1, thereby rotating the feed roller 3 at 7.6 inches/sec. During the execution of a printing operation, the print medium P2 is intermittently conveyed, and the printhead 7 starts the next printing based on print data on the print medium P2. When the print medium P2 is intermittently conveyed, the print medium P1 is also intermittently conveyed.

In this manner, while the succeeding print medium P2 overlaps the preceding print medium P1, a conveying operation is performed (to be referred to as successive overlapped conveyance hereinafter).

<Printing Medium Separating Operation>

In the above successive overlapped conveyance, it is conceivable that when paper discharging is performed in a face-down manner in this state, the order of sheets is interchanged. This can cause a deterioration in paper discharging performance.

Therefore, in this embodiment, a separating operation for separating the print medium P1 and the print medium P2 is performed to prevent a deterioration in paper discharging performance by performing paper discharging while the print media do not overlap each other.

At least two rollers are used to implement a separating operation. In this embodiment, one of these rollers which is located on the upstream side is the conveyance roller 10, and the other roller on the downstream side is the conveyance roller 20. Whether the trailing end of the print medium P1 has passed through the conveyance roller 10 (state ST18A) is determined based on the rotation amount of the conveyance roller 5 from the start of a printing operation on the print medium P and the length of the print medium (sheet length).

Figure 7A:
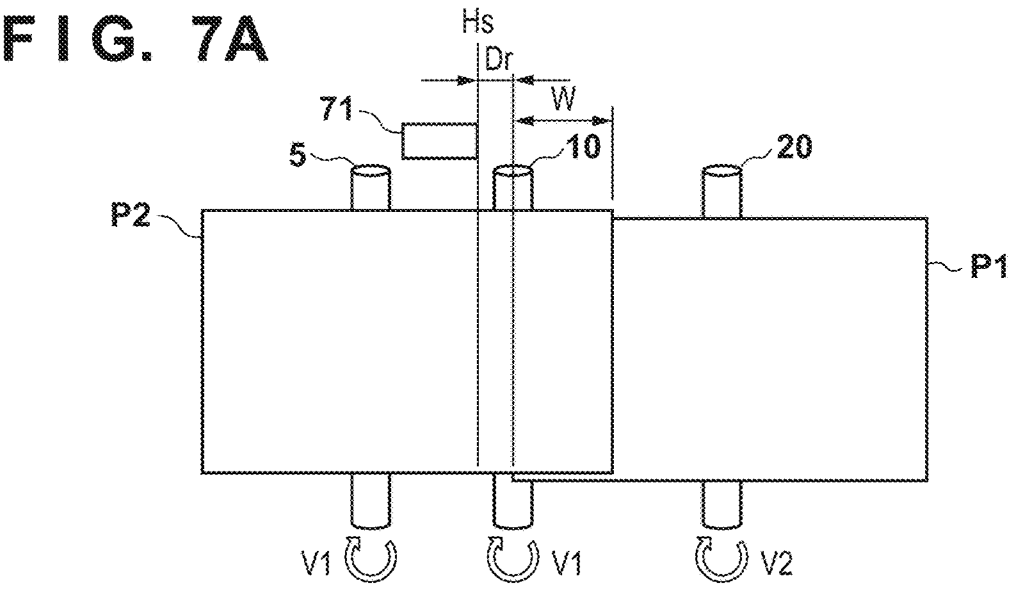
FIGS. 7A to 7C are schematic top views showing an example of the printing apparatus in each state.

FIG. 7A is a schematic view showing the relative positional relationship among elements in the state ST18A. In this state, the paper discharge motor 215 continuously rotates the conveyance roller 20 and the paper discharge roller 22 independently of the conveyance rollers 5 and 10, thereby implementing a separating operation.

Note that in this embodiment in which the printing apparatus 9 is a serial printer, during the execution of a separating operation, an intermittent conveying operation for the print medium P and the scanning printing operation of the printhead 7 between the intermittent conveyances are alternately repeated.

In this case, as shown in FIG. 7A, V1 represents the conveying speed of the conveyance rollers 5 and 10, and V2 represents the conveying speed of the conveyance roller 20 and the paper discharge roller 22. In addition, W represents the overlap amount between the print media P1 and P2, Dr represents the distance from the separation start position to the most downstream position of the nozzle 71. A most downstream position Hs of the nozzle 71 is calculated as W+Dr from the leading end of the print medium P2.

Note that the conveying speed V2 of the conveyance roller 20 and the paper discharge roller 22 is provided with an upper limit speed V2max ($V2max \geq V2$) as a criterion or allowable range for prevention of noise, reduction of power consumption, or the like as one purpose. In order to separate the print medium P1 and the print medium P2 by the separating operation, a wait operation of stopping the conveyance rollers 5 and 10 may be performed.

After the separating operation is started, the conveyance roller 20 conveys the print medium P1, and the trailing end passes through the conveyance roller 20 (state ST18B).

Figure 7B:
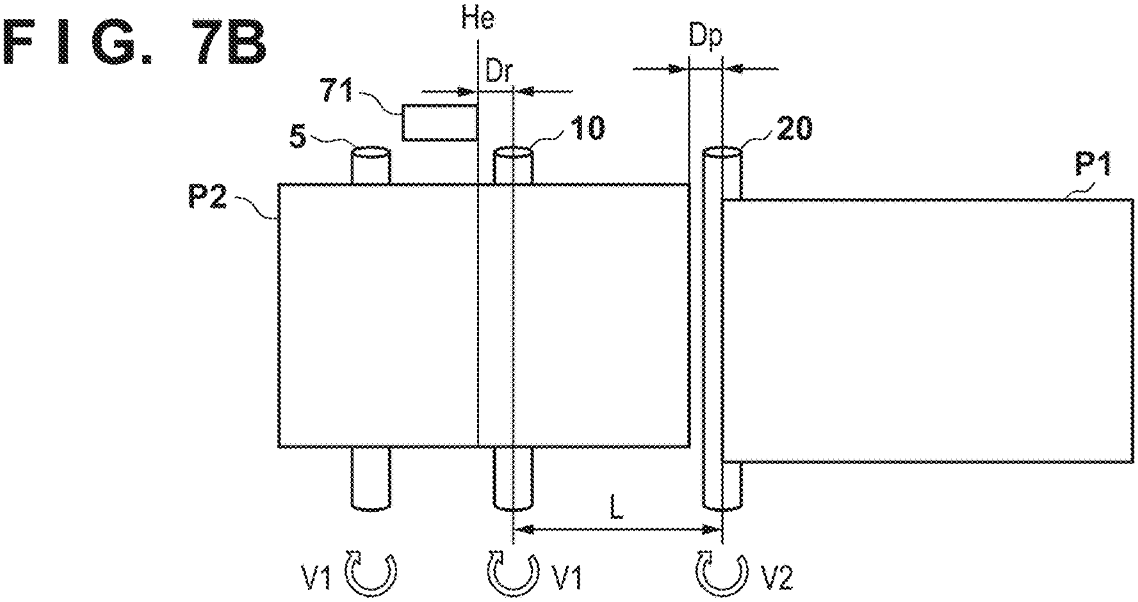

FIG. 7B is a schematic view showing the relative positional relationship among elements in the state ST18B. In this state, the speed of the conveyance roller 20 is controlled so as to complete the separating operation when the interval between the trailing end of the print medium P1 and the leading end of the print medium P2 becomes a distance Dp ($Dp \geq 0$ (preferably $Dp > 0$)). This will properly separate the print media P1 and P2 from each other and cancel the state in which the trailing end of the print medium P1 overlaps the leading end of the print medium P2.

In this case, as shown in FIG. 7B, L represents the distance from a separation start position to a separation end position. A most downstream position He of the nozzle 71 is calculated as L−Dp+Dr from the leading end of the print medium P2.

Figure 7C:
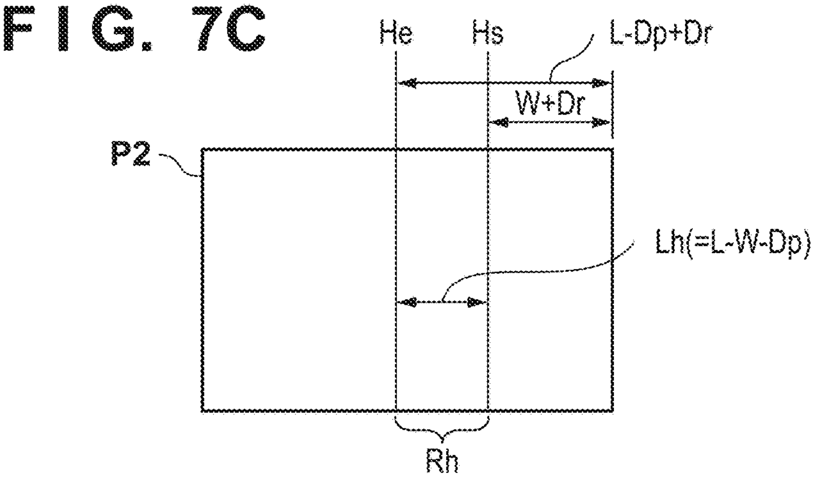

FIG. 7C is a schematic view for comparison between the positions Hs and He described above. The region between the positions Hs and He corresponds to a region on a sheet at which a separating operation is executed with reference to the most downstream position of the nozzle 71 and will be referred to as a separation region Rh. A distance (length or width) Lh of the separation region Rh is calculated as $$Lh = L - W - Dp$$

and the separation region Rh corresponds to a region where the print medium P2 passes through the conveyance roller 10 in the interval between the instant when the trailing end of the print medium P1 passes through the conveyance roller 10 and the instant when the trailing end passes through the conveyance roller 20.

Note that the position Hs corresponds to the separation start position, and the position He corresponds to the separation end position.

The driving mode for implementing a separating operation may be partially changed without departing from the gist of the driving mode. For example, the positions Hs and He may be located at the most downstream position of the nozzle 71 used in each printing operation and may be changed for each printing operation.

The timing when a separating operation is started may be after the timing when the trailing end of the print medium P1 passes through the conveyance roller 10. In addition, the timing when the separating operation is ended may be controlled such that the interval between the trailing end of the print medium P1 and the leading end of the print medium P2 becomes equal to or more than the distance Dp.

In this example, a separating operation is ended at the timing when the trailing end of the print medium P1 passes through the conveyance roller 20. In another example, the separating operation may be ended until the trailing end of the print medium P1 passes through an arbitrary point set in advance.

In this example, the rollers 10 and 20 are mainly used for a separating operation. However, in another example, when the conveyance roller 10 is a one-way roller, the rollers 5 and 10 may be mainly used for a separating operation. That is, of the two rollers mainly used for a separating operation, one roller on the upstream side may be positioned upstream or downstream of the printhead 7.

Figure 8:
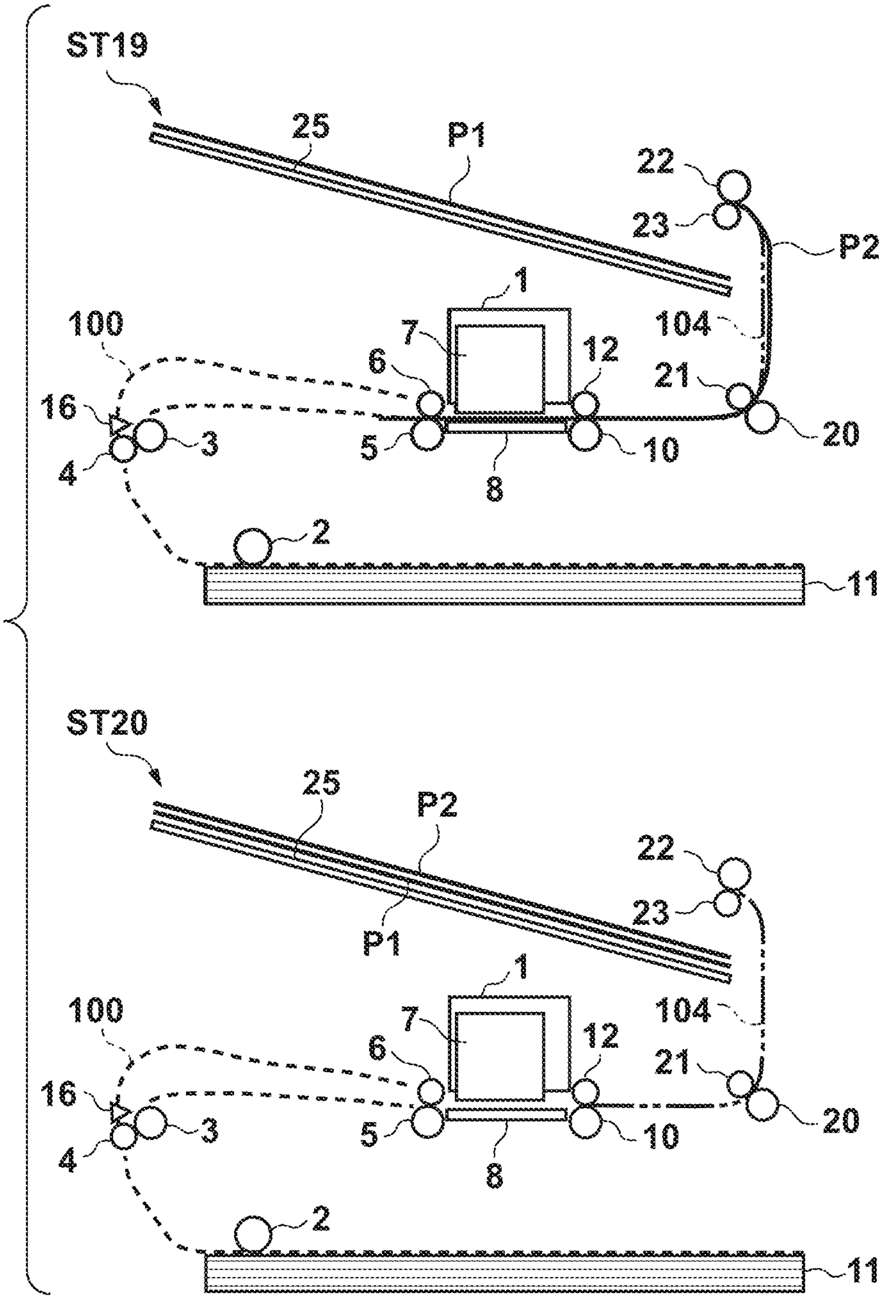
FIG. 8 is a schematic top view showing an example of the printing apparatus in each state.

As shown in FIG. 8, the printed print medium P1 is discharged in this manner onto the paper discharge unit 25 by the conveyance roller 20 and the paper discharge roller 22 (state ST19). With a similar procedure, the print medium P2 having undergone printing is discharged onto the paper discharge unit 25 by the conveyance roller 20 and the paper discharge roller 22 (state ST20).

In this manner, successive overlapped conveyance, a separating operation, and a nozzle shift operation are sequentially performed to perform a printing operation for the plurality of print media P. Although each operation has been described by exemplifying the case of one-side printing, the contents described above can also be applied to the case of two-sided printing.

<Contents of Control for Execution of Successive Overlapped Conveyance>

The contents of control for implementing a printing operation accompanying successive overlapped conveyance according to this embodiment will be described with reference to FIG. 9. Generalized control contents will be described by using, as parameters, the printing order N, the page K in print data, and the page count M of print media (N is an arbitrary integer from 1 to Nmax) as exemplified in FIG. 3.

Assume that N, K, and M correspond to each other, that is, Nis an integer from 1 to Nmax, and printing is performed on the N(K)th page of the N(M)th print medium at the Nth turn.

Figure 9A:
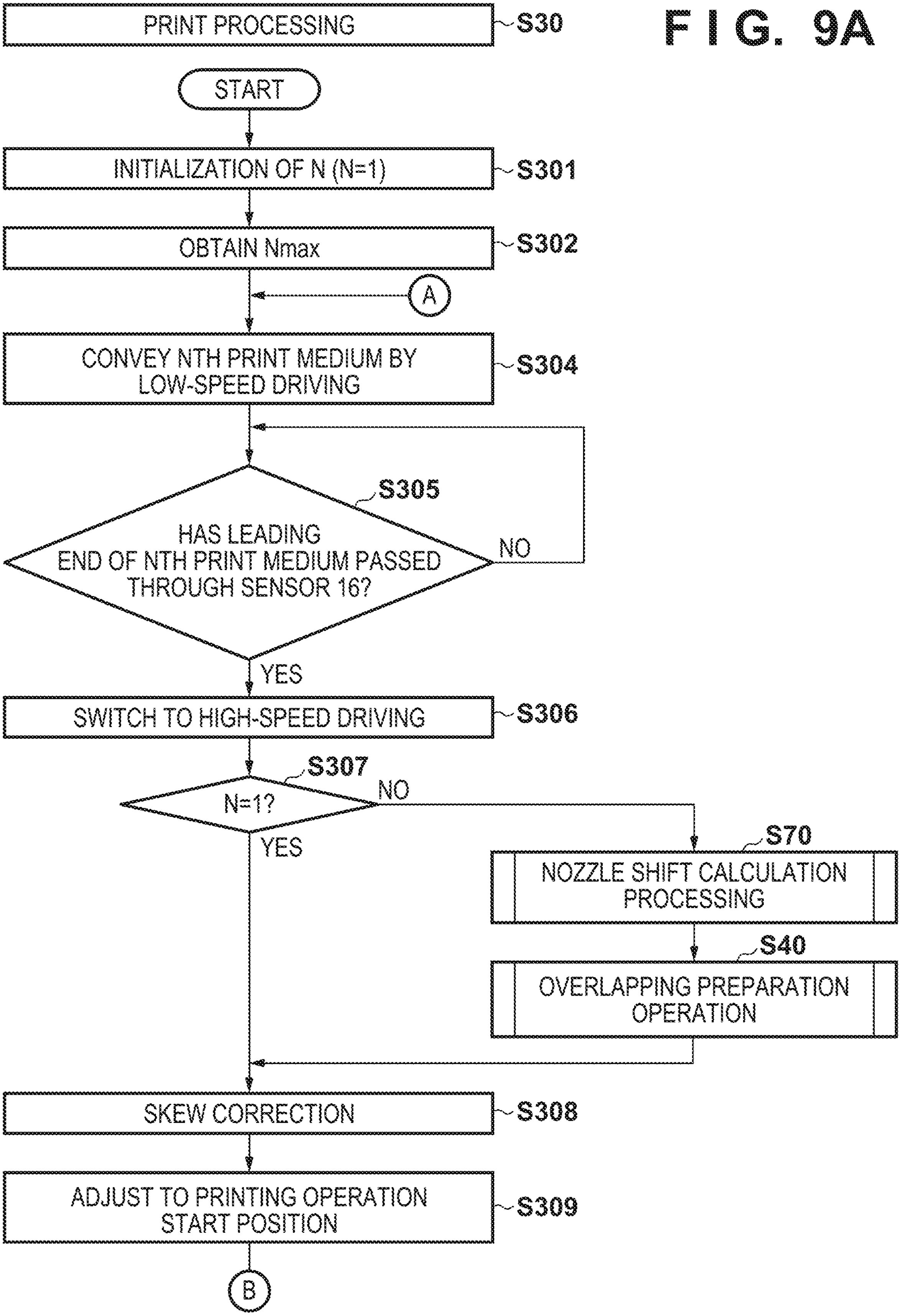
FIGS. 9A and 9B is a flowchart showing overall control contents at the time of the execution of a printing operation.
Figure 9B:
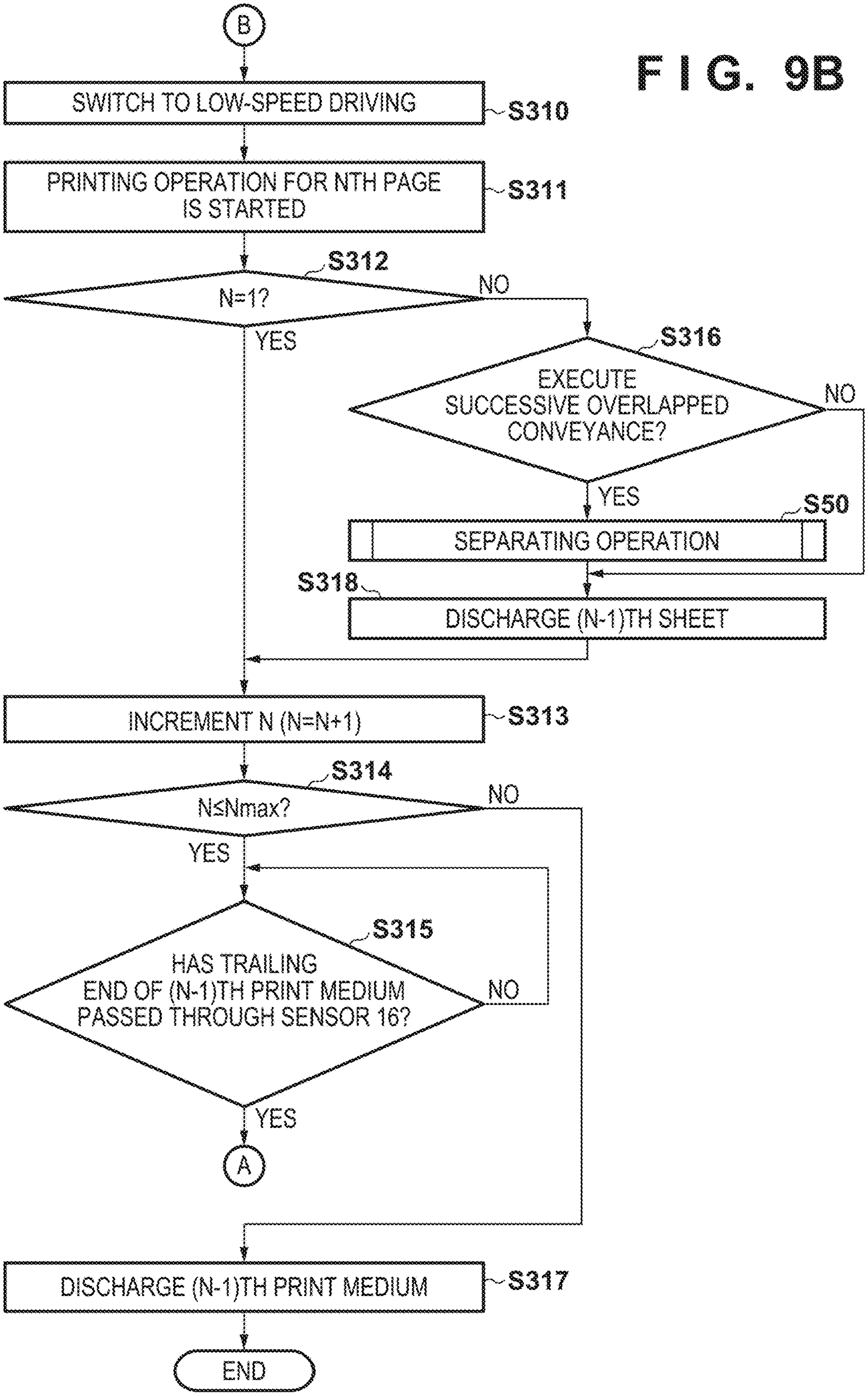

FIG. 9 shows flowchart S30 indicating overall control contents at the time of the execution of a printing operation. Flowchart S30 can be executed mainly by the CPU 201.

In step S301 (to be simply referred to as "S301" hereinafter; the same applies to the other steps to be described later), the parameter N is initialized as N=1.

In S302, the parameter Nmax is obtained based on print data.

In S304, the Nth print medium is started to be fed by low-speed driving (conveying speed of 7.6 inches/sec).

In S305, it is determined whether the leading end of the Nth print medium has passed through the sensor 16. If the leading end of the Nth print medium has passed through the sensor 16 (YES in the determination), the process advances to S306; otherwise (NO in the determination), the process returns to S305.

In S306, the conveyance mode of the Nth print medium is switched to high-speed driving (conveying speed of 20 inches/sec). With this operation, the leading end of the Nth print medium catches up to the trailing end of the (N−1)th print medium.

In S307, it is determined whether N=1. If N=1 (YES in the determination), that is, there is no preceding print medium P that should be overlapped, the process advances to S308. In contrast to this, if N≠1 (NO in the determination), that is, there is a possibility that successive overlapped conveyance may be performed, nozzle shift calculation processing (to be described later) is executed in S70. Based on the processing result, an overlapping preparation operation (to be described later) is executed in S40.

In S308, the skew of the Nth print medium is corrected. In this case, if it is determined in S307 that N=1 (YES in the determination in S307), the skew of the Nth print medium is independently corrected. If it is determined that Fr=0 in overlapping preparation operation S40 (to be described later), the skew of the Nth print medium is corrected in an overlapping state with the (N−1)th print medium. If it is determined that Fr=1, the skew of the Nth print medium is independently corrected.

In S309, the Nth print medium is adjusted at a printing operation start position. If the skew of the Nth print medium is corrected in S308 in an overlapping state with the (N−1)th print medium, the adjustment is performed in this state.

In S310, the conveyance mode of the Nth print medium is switched to low-speed driving (a conveying speed of 7.6 inches/sec).

In S311, a printing operation for the Nth page of the Nth print medium is started.

In S312, it is determined whether N=1. If N=1 (YES in the determination), the process advances to S313; otherwise (NO in the determination), the process advances to S316.

In S316, it is determined whether successive overlapped conveyance is executed. If successive overlapped conveyance is executed (YES in the determination), a separating operation is executed in S50, although described in detail later, and the process advances to S318; otherwise (NO in the determination), the process skips S50 and advances to S318.

In S318, the (N−1)th print medium is discharged onto the paper discharge unit 25.

In S313, the parameter N is incremented (N=N+1).

In S314, it is determined whether N≤Nmax. If N≤Nmax (YES in the determination), the process advances to S315; otherwise (NO in the determination), the process advances to S317.

In S315, it is determined whether the trailing end of the (N−1)th print medium has passed through the sensor 16. If the trailing end of the (N−1)th print medium has passed though the sensor 16 (YES in the determination), the process returns to S304; otherwise (NO in the determination), the process returns to S315.

In S317, the (N−1)th print medium is discharged. With this operation, printing on all the print media P is completed, and flowchart S30 is terminated.

Example 1

<One Mode of Successive Overlapped Conveyance>

Figure 10:
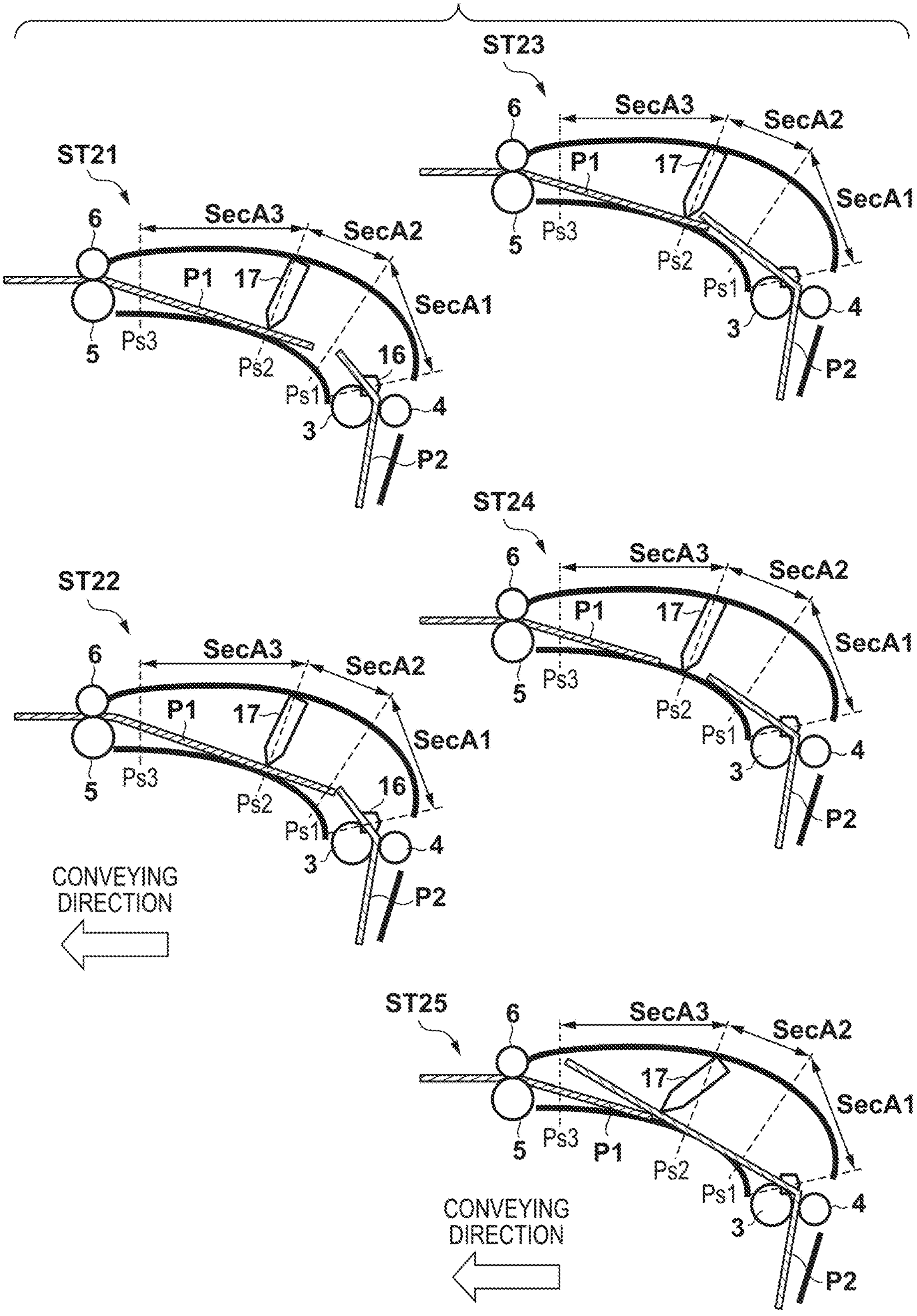
FIG. 10 is a schematic view for explaining a detailed mode of successive overlapped conveyance.

FIG. 10 is a schematic enlarged view for explaining a detailed mode of the above-described successive overlapped conveyance in which the print media P1 and P2 are conveyed while the succeeding print medium P2 overlaps on the preceding print medium P1. Each of states ST21 to ST25 shown in FIG. 10 shows the print media P1 and P2 in the conveyance path from the rollers 3 and 4 to the rollers 5 and 6. In this embodiment, the conveyance path from the rollers 3 and 4 to the rollers 5 and 6 can be provided with a pressing lever 17 for downwardly directing the trailing end portion of the print medium P passing therethrough.

For the sake of easy description, the conveyance path from the rollers 3 and 4 to the rollers 5 and 6 is divided into three regions SecA1 to SecA3. The region SecA1 corresponds to the region from the print medium detection sensor 16 to a position Ps1. The region SecA2 corresponds to the region between the position Ps1 and a position Ps2. The region SecA3 corresponds to the region between the position Ps2 and a position Ps3. An operation of overlapping the leading end portion of the succeeding print medium P2 on the trailing end portion of the preceding print medium P1 can be implemented in the region SecA2 by the action of the pressing lever 17.

The points Ps1 to Ps3 can be set in the conveyance path from the rollers 3 and 4 to the rollers 5 and 6 based on the structure. For example, the point Ps1 can be set based on the movable region, biasing force, and the like of the pressing lever 17. Note that the point Ps2 can be set based on the position of the pressing lever 17, and the point Ps3 can be set as a predetermined position on the upstream side of the rollers 5 and 6.

In the state ST21, the print medium P2 is conveyed such that the leading end of the print medium P2 catches up with the trailing end of the print medium P1 located in the region SecA2. When the leading end of the print medium P2 catches up with the trailing end of the print medium P1, as shown in the state ST23, an overlapping operation of partially overlapping the print medium P2 on the print medium P1 is implemented.

On the other hand, if the trailing end of the print medium P1 is located in the region SecA1 as exemplarily shown in the state ST22, or if the trailing end of the print medium P1 is located in the region SecA3 as shown in the state ST24, an overlapping operation is not performed.

Figure 14:
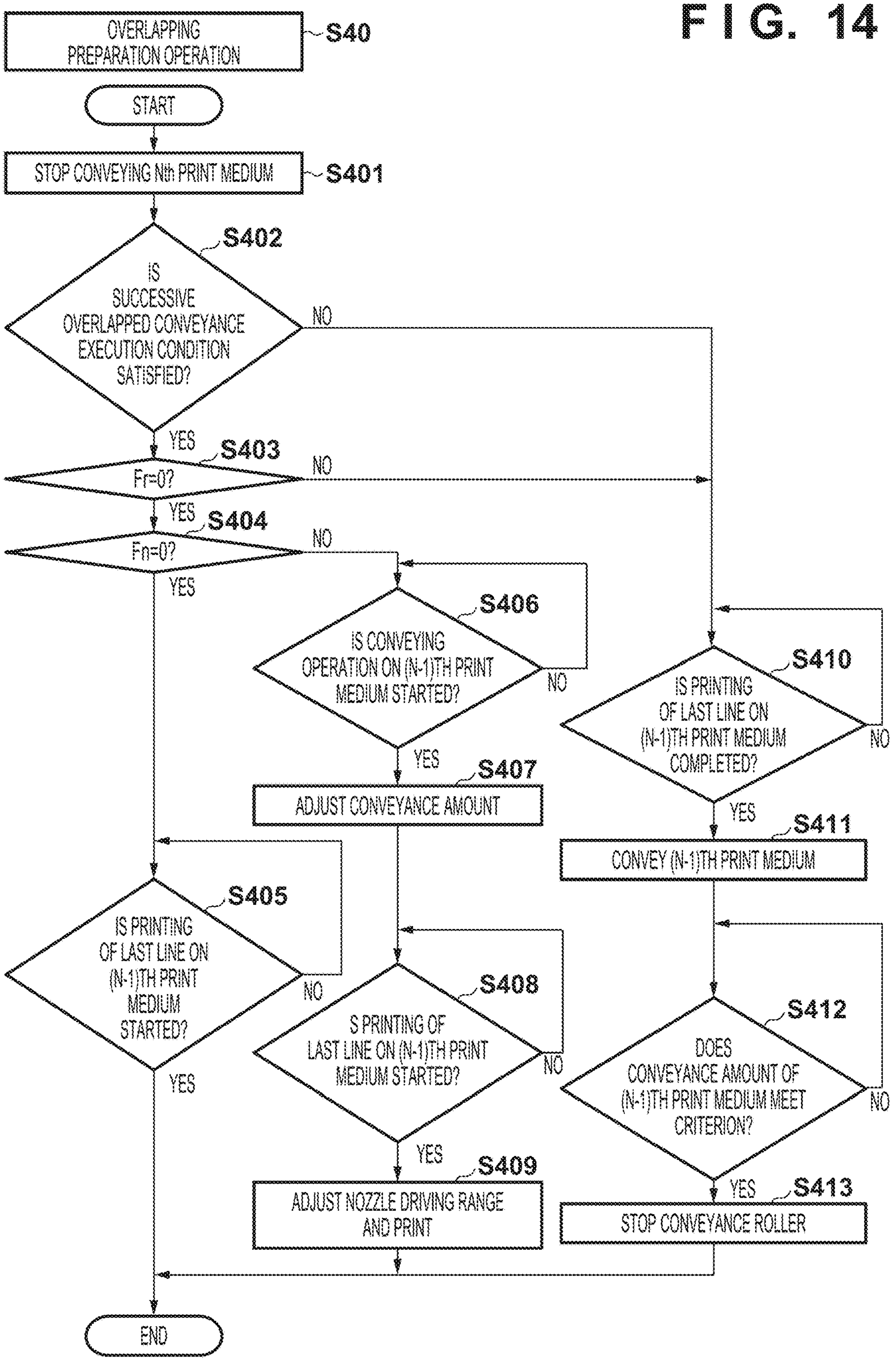
FIG. 14 is a flowchart showing an example of an overlapping preparation operation.

In the state ST25, the succeeding print medium P2 is stopped (see S401 of FIG. 14). The point Ps3 corresponds to the position of the leading end of the print medium P2 at this time. Although described in detail later, when canceling the overlapping state of the print media P1 and P2, it can be determined in the state ST25 whether to execute the cancelation.

<Nozzle Shift Operation>

As has been described above, the conveying speed V2 of the conveyance roller 20 and the paper discharge roller 22 is provided with the upper limit speed V2max (V2≤V2max) as a criterion or allowable range for prevention of noise, reduction of power consumption, or the like as one purpose. Hence, a situation where V2>V2max can occur depending on the contents of print data. Therefore, in this embodiment, a preparation operation prior to a separating operation can be performed during the overlapping operation, as needed. In the preparation operation, the conveyance amount of the print medium P1 is adjusted, and the driving range of the nozzle 71 in the printhead 7 for implementing the last scanning printing on the print medium P1 is adjusted accordingly (nozzle shift operation).

Note that in this specification, an expression "adjust" is used, but another expression such as "change", "shift", "reset", or "correct" may be used without departing from the gist.

Figure 11A:
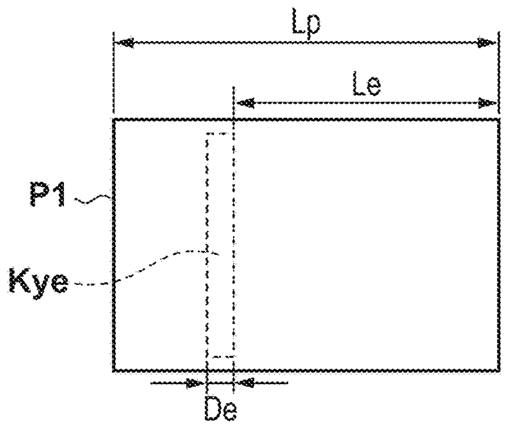
FIGS. 11A to 11C are schematic views showing the conveyance mode at the time of the execution of a nozzle shift operation.
Figure 11B:
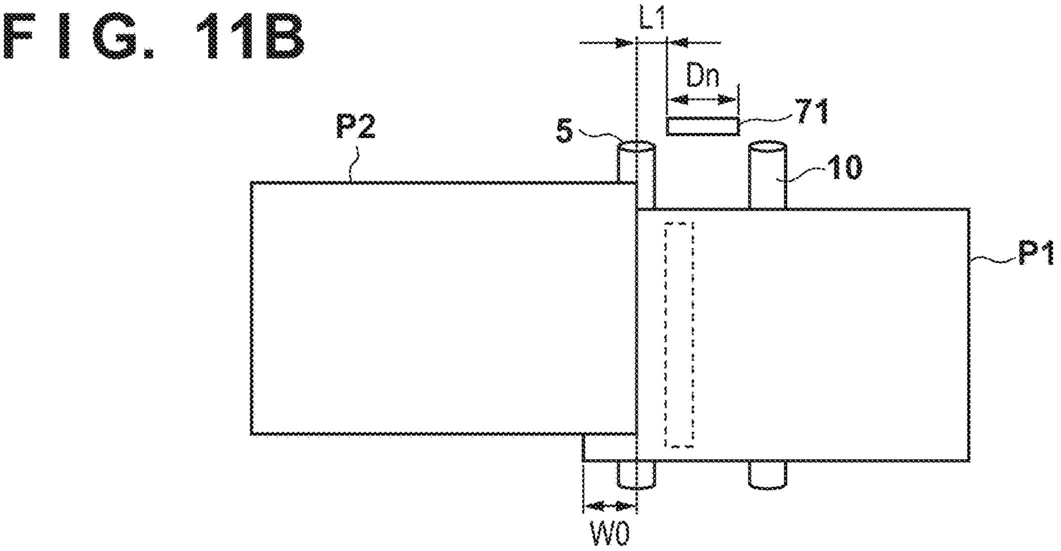
Figure 11C:
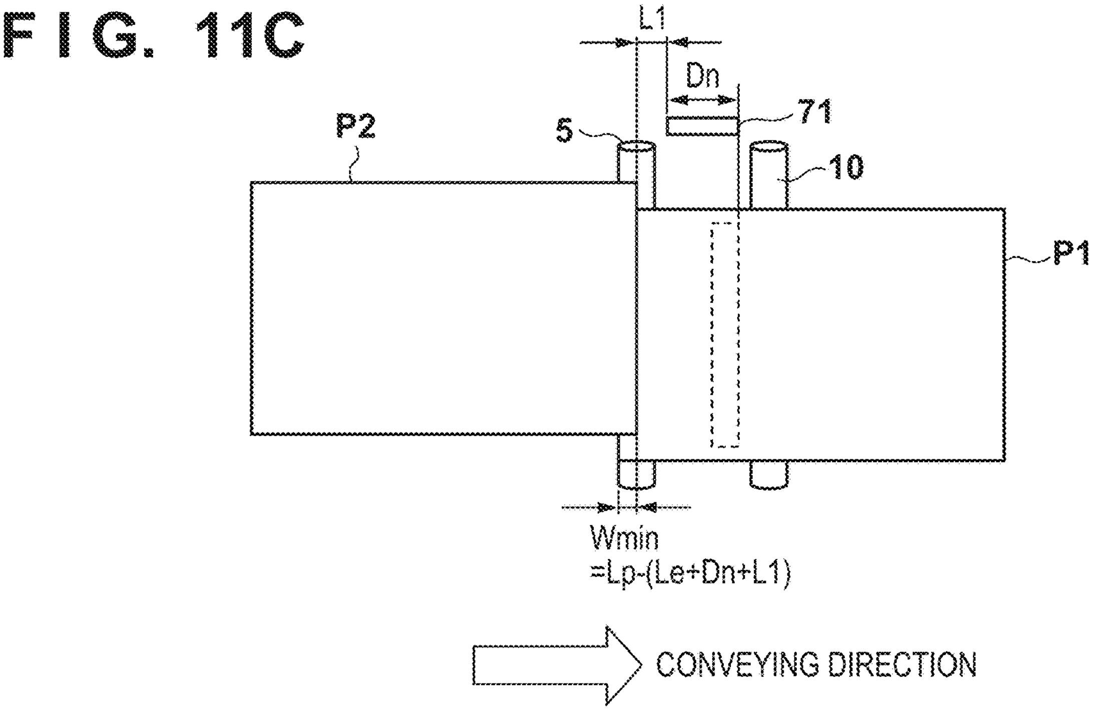
Figure 12A:
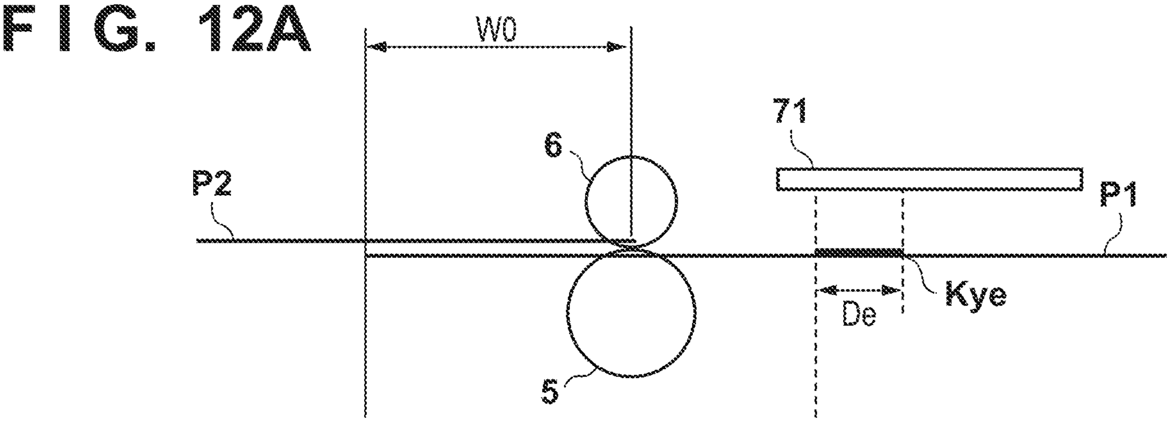
FIGS. 12A and 12B are schematic views showing the conveyance mode at the time of the execution of the nozzle shift operation.
Figure 12B:
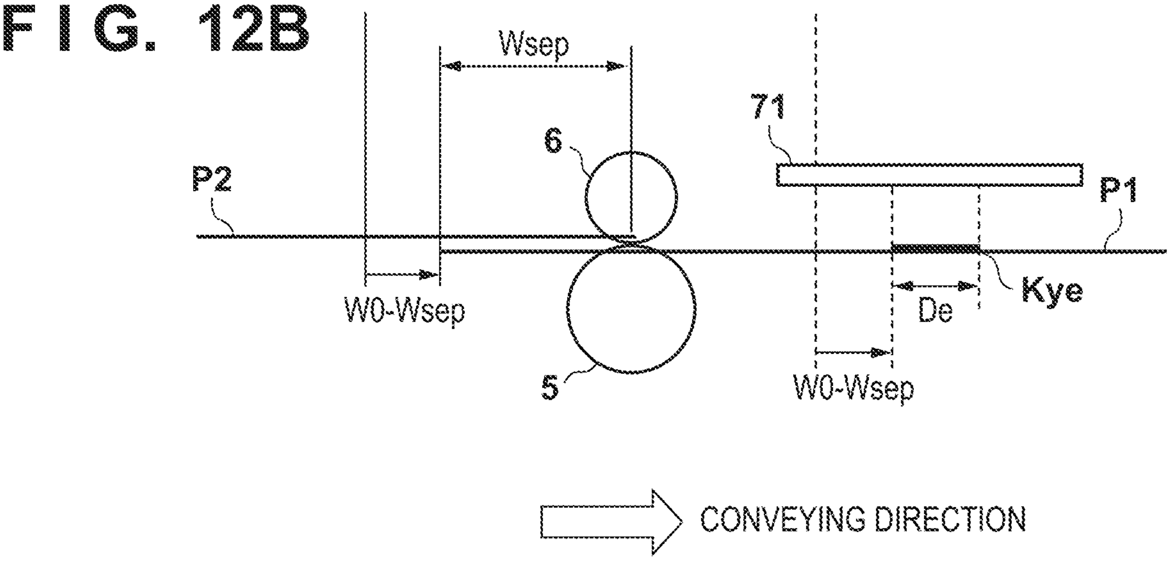

FIGS. 11A to 11C are schematic top views showing the conveyance mode at the time of the execution of a nozzle shift operation, and FIGS. 12A and 12B are schematic side views thereof.

Assume that, when the length of the print medium P is expressed as a distance Lp, a print region by the last scanning printing (a print region of the last line) Kye of the printhead 7 on the print medium P1 is located at a distance Le from the leading end of the print medium P1 as shown in FIG. 11A. The print width (printing width) of the print region Kye is expressed as a distance De. Let W (variable) be the overlap amount of the print media P1 and P2, and W0 be the initial value thereof. Note that, in general, the larger the overlap amount W, the higher the conveyance efficiency of the plurality of print media P. Therefore, the initial overlap amount W0 also corresponds to the maximum value of the overlap amount W.

FIG. 11B shows the relative positional relationship among elements (here, the print media P1 and P2, the rollers 5 and 10, and the nozzle 71) in a case where a nozzle shift operation is not performed.

FIG. 11C shows the relative positional relationship in a case where the overlap amount W is a minimum overlap amount Wmin, which is the minimum value of the overlap amount W. When the length of the nozzle 71 is expressed by a distance Dn, and the distance from the roller 5 to the nozzle 71 (the upstream end of the nozzle 71) is expressed by a distance L1, the minimum overlap amount Wmin is expressed as:

$$W\min = Lp - (Le + Dn + L1)$$

That is, the overlap amount W can be adjusted in a range of W0≥W≥Wmin.

FIG. 12A corresponds to a schematic side view in the case where the overlap amount W is the initial value W0 (the case shown in FIG. 11B). FIG. 12B corresponds to a schematic side view in a case where the print medium P1 is shifted to the downstream side from the state shown in FIG. 12A, thereby having an overlap amount Wsep.

The overlap amount Wsep can be decided as the maximum value of the overlap amount W satisfying V2≤V2max. As can be seen from comparison of FIGS. 12A and 12B, the overlap amount W is adjusted in the nozzle shift operation. With this operation, the driving range of the nozzle 71 in the printhead 7 for implementing the last scanning printing on the print medium P1 is adjusted (the driving target is changed), and the conveyance amount of the print medium P1 is adjusted accordingly.

In this state, printing of the last line is executed on the preceding print medium P1, and the leading end of the succeeding print medium P2 abuts against the conveyance nip portion (rollers 5 and 6), thereby correcting the skew of the print medium. Although described in detail later, when the overlap amount W is changed from W0 to Wsep by the nozzle shift operation, the conveyance amount of the print medium P1 is added by W0–Wsep, and the range of the nozzle 71 as the driving target is shifted to the downstream side by W0–Wsep.

<Nozzle Shift Calculation Processing>

The shift amount (adjustment amount) of the conveyance amount of the print medium P (the print medium P1 in the above example) and the shift amount of the driving target of the nozzle 71 at the time of the execution of the nozzle shift operation described above are calculated by nozzle shift calculation processing S70 (see FIG. 9).

Figure 13:
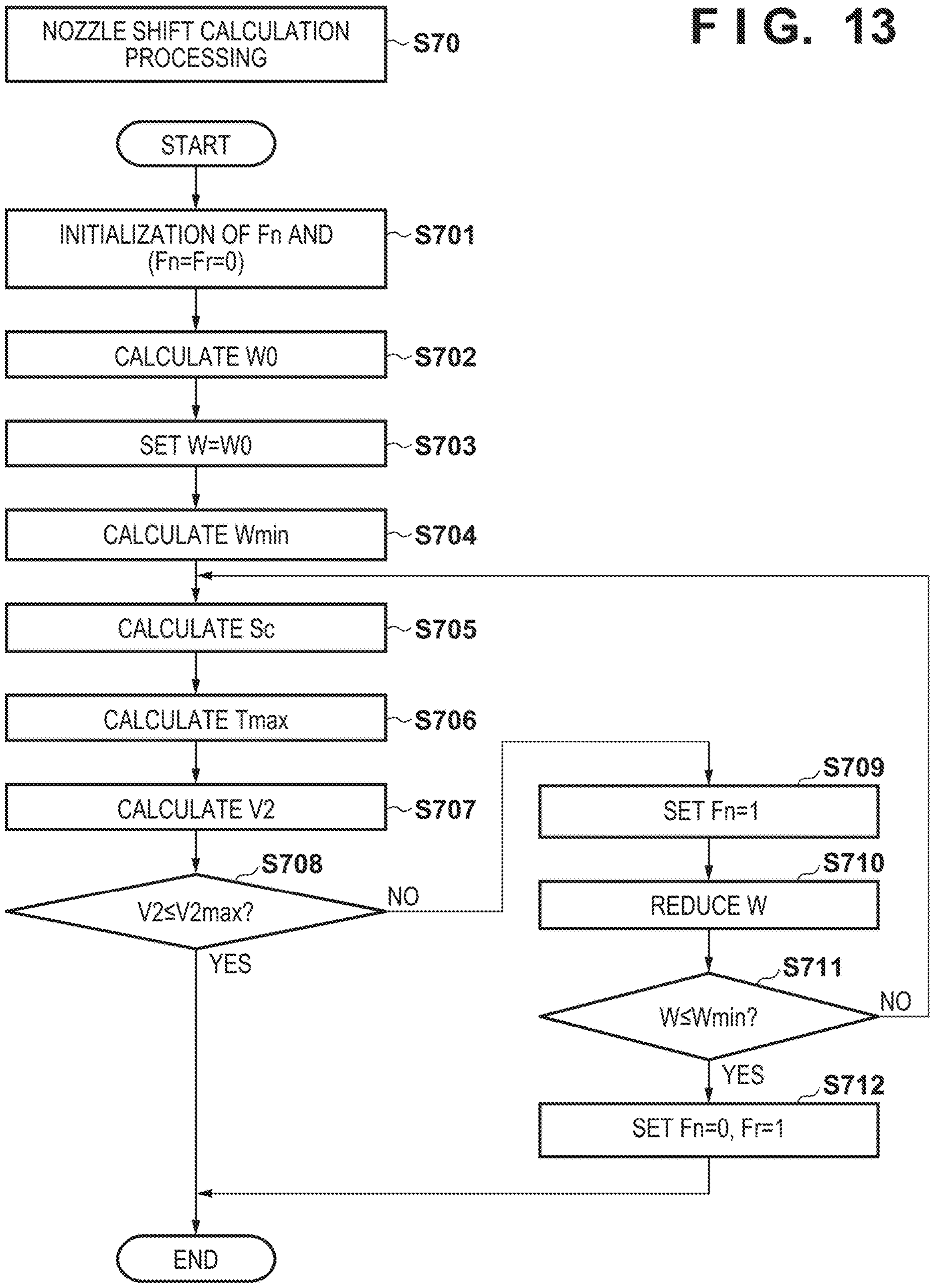
FIG. 13 is a flowchart showing an example of nozzle shift calculation processing.

FIG. 13 is a flowchart showing an example of nozzle shift calculation processing S70.

In S701, a nozzle shift execution flag Fn and an exception processing flag Fr are initialized as Fn=0 and Fr=0 (Fn=0 indicates that no nozzle shift operation is executed, Fn=1 indicates that a nozzle shift operation is executed, Fr=0 indicates that no exception processing is executed, and Fr=1 indicates that exception processing is executed).

In S702, the initial overlap amount W0 is calculated based on the print data for the preceding print medium P (the print medium P1 in the above example).

In S703, the overlap amount W is set to the initial overlap amount W0.

In S704, the minimum overlap amount Wmin in the changeable range of the nozzle 71 as the driving target is calculated. As has been described above, the minimum overlap amount Wmin can be expressed as (see FIG. 11C):

$$W\text{min} = Lp - (Le + Dn + L1)$$

In S705, based on the print data for the succeeding print medium P (the print medium P2 in the above example), the number of times of scanning that can be performed while the most downstream position of the nozzle 71 intermittently passes through the separation region Rh (the distance Lh of the separation region Rh) is calculated as a scan count Sc. Assume also that the required time per scan is a scan time Ts (see FIG. 16).

In S706, a separation enable time Tmax is calculated. The separation enable time Tmax is calculated based on the scan count Sc, the scan time Ts, the distance Lh of the separation region Rh, and the conveying speed V1 of the succeeding print medium P, and can be calculated as:

$$\begin{aligned} T\text{max} &= Lh / V1 + Sc \times Ts \\ &= (L - W - Dp) / V1 + Sc \times Ts \end{aligned}$$

Note that the conveying speed V1 of the succeeding print medium P is the conveying speed of the conveyance roller 10 in this embodiment.

Figure 16:
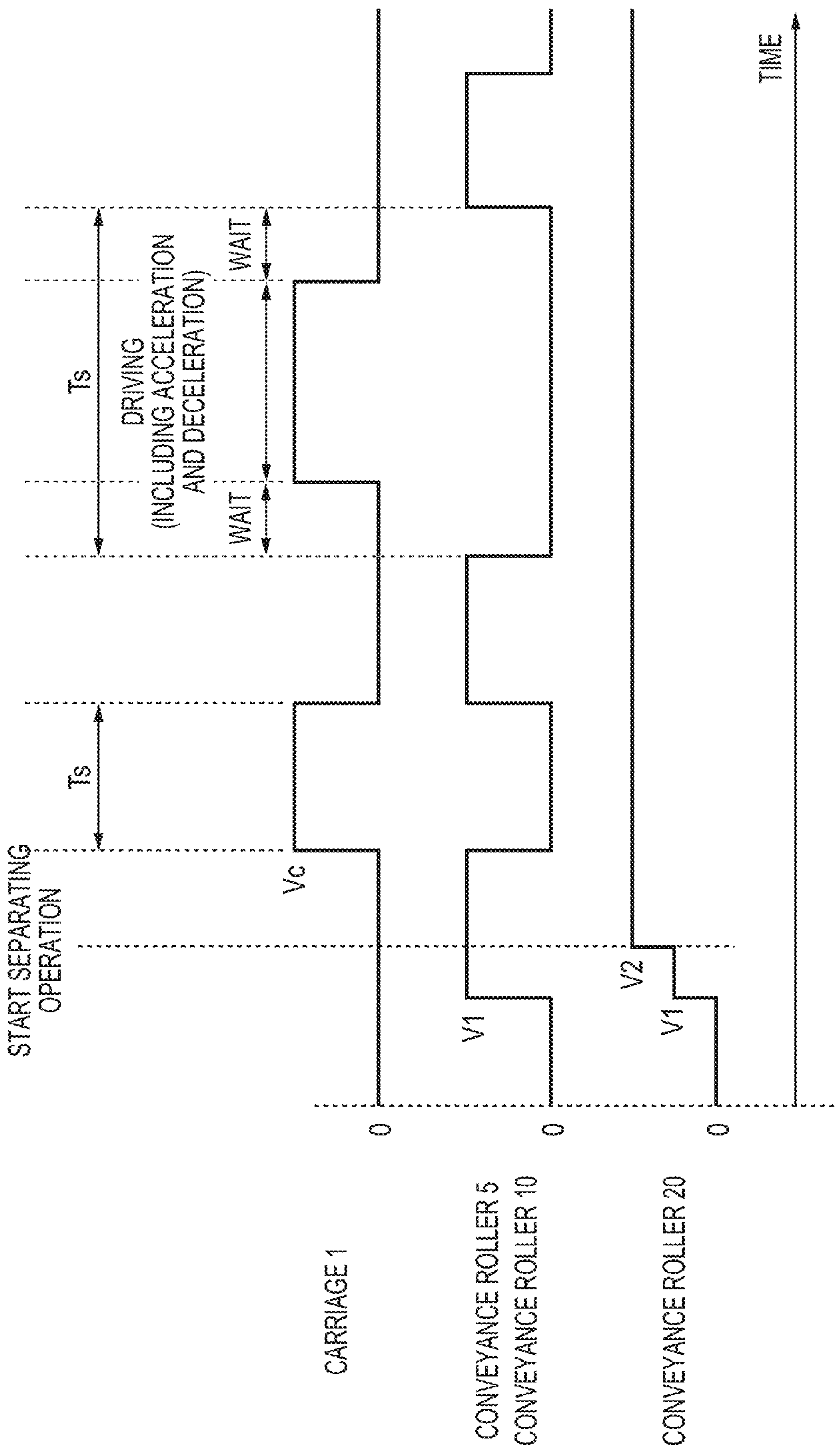
FIG. 16 is a timing chart showing the contents of drive control at the time of the execution of the separating operation.

FIG. 16 is a timing chart showing the contents of drive control on each mechanism at the time of the execution of a separating operation. FIG. 16 indicates that the conveyance rollers 5 and 10 are intermittently driven (conveying speed V1), and the carriage 1 is driven at a scanning speed Vc between the intermittent driving operations. Note that the driving of the carriage 1 is represented by a rectangular signal waveform in FIG. 16, but the scan time Ts can include acceleration and deceleration times before and after each scanning printing operation.

The conveyance roller 20 is driven at the conveying speed V1 or V2 and is driven at the conveying speed V2 when executing a separating operation.

Referring to FIG. 13 again, in S707, the speed V2 of the preceding print medium p upon performing the separating operation is calculated. The speed V2 is calculated based on the separation enable time Tmax and the distance Lh of the separation region Rh, and can be calculated as:

$$V2 = Lh / T\text{max}$$

In S708, it is determined whether the speed V2 of the preceding print medium P is equal to or lower than the upper limit speed V2max (whether V2≤V2max). If the speed V2 is equal to or lower than the upper limit speed V2max (YES in the determination), this flowchart is terminated; otherwise (NO in the determination), the process advances to S709.

In S709, nozzle shift execution flag Fn=1 is set.

In S710, a predetermined amount is subtracted from the overlap amount W, and the reduced overlap amount W is temporarily held in the RAM 203 or the like. The subtraction amount in this step may be, for example, a value of an integer multiple of the pitch of the nozzle 71, a fixed value such as 0.1 mm or 1 mm, or may be a calculated value based on the number of subtractions (the number of repetitions of S705 to S711).

In S711, it is determined whether the overlap amount W of the trailing end portion of the preceding print medium P and the leading end portion of the succeeding print medium P is equal to or smaller than the minimum overlap amount Wmin (whether W≤Wmin). If it is determined that the overlap amount W is equal to or smaller than the minimum overlap amount Wmin (YES in the determination), the process advances to S712; otherwise (NO in the determination), the process returns to S705.

Note that if NO in the determination in S711, since the distance Lh (=L–W–Dp) of the separation region Rh changes due to the subtraction of the overlap amount W, the scan count Sc is recalculated in S705.

In S712, nozzle shift execution flag Fn=0 and exception processing flag Fr=1 are set. That is, considering that separation cannot be performed by adjusting the overlap amount W by the nozzle shift operation (the overlapping state of the preceding print medium P and the succeeding print medium P cannot be canceled), the exception processing is executed.

By repeating S705 to S711 in this manner, the maximum overlap amount Wsep under the condition V2≤V2max can be approximately decided.

When this flowchart is terminated, for example, if the nozzle shift execution flag Fn=0 and exception processing flag Fr=0, neither the nozzle shift operation nor the exception processing is set to be performed, and the overlap amount W is set to the initial overlap amount W0.

For example, if nozzle shift execution flag Fn=1 and exception processing flag Fr=0, the nozzle shift operation is set to be performed, and the overlap amount W is set to a reduced value obtained by repeating S705 to S711.

<Overlapping Preparation Operation>

FIG. 14 is a flowchart showing an example of overlapping preparation operation S40.

In S401, the Nth print medium P being conveyed is stopped at a predetermined position on the upstream side of the conveyance roller 5. The position of the leading end of the Nth print medium P can be calculated based on, for example, the rotation amount of the feed roller 3 after the detection of the leading end of the Nth print medium P by the print medium detection sensor 16.

In S402, it is determined whether a successive overlapped conveyance execution condition indicating the propriety of execution of successive overlapped conveyance is satisfied. For example, if the overlap amount W is smaller than a criterion, it can be determined that the successive overlapped conveyance execution condition is not satisfied (successive overlapped conveyance cannot be executed). If it is determined that the successive overlapped conveyance execution condition is satisfied (YES in the determination), the process advances to S403; otherwise (NO in the determination), the process advances to S410.

In S403, it is determined whether exception processing flag Fr=0 (whether to execute exception processing). If Fr=0 (YES in the determination), the process advances to S404; otherwise (NO in the determination), the process advances to S410.

In S404, it is determined whether the nozzle shift execution flag Fn=0 (whether to execute a nozzle shift operation). If Fn=0 (YES in the determination), the process advances to S405; otherwise (NO in the determination), the process advances to S406.

In S405, it is determined whether printing of the last line on the (N−1)th print medium P is started. If the printing is not started (NO in the determination), the process returns to S405; otherwise (YES in the determination), this flowchart is terminated.

If a nozzle shift operation is executed (NO in the determination in S404), it is determined in S406 whether a conveying operation for performing printing of the last line on the (N−1)th print medium P is started. If the conveying operation is not started (NO in the determination), the process returns to S406; otherwise (YES in the determination), the process advances to S407.

In S407, the conveyance amount for performing printing of the last line on the (N−1)th print medium P is adjusted, and a conveying operation is performed using the conveyance amount obtained by adding W0−W to the conveyance amount used when no nozzle shift operation is performed.

In S408, it is determined whether printing of the last line on the (N−1)th print medium P is started. If the printing is not started (NO in the determination), the process returns to S408; otherwise (YES in the determination), the process advances to S409.

In S409, the range of the nozzle 71 to be driven in the printing of the last line on the (N−1)th print medium P is adjusted, and the nozzle 71 in the range shifted from the driving range for performing no nozzle shift operation to the downstream side by W0−W is driven.

If the successive overlapped conveyance execution condition is not satisfied (NO in the determination in S402), and if exception processing is executed (NO in the determination in S403), it is determined in S410 whether printing of the last line on the (N−1)th print medium P is completed. If the printing is not completed (NO in the determination), the process returns to S410; otherwise (YES in the determination), the process advances to S411.

In S411, the (N−1)th print medium P is conveyed by the conveyance roller 5.

In S412, it is determined whether the conveyance amount of the (N−1)th print medium P after its trailing end passes through the conveyance roller 5 meets a criterion. If the conveyance amount does not meet the criterion (NO in the determination), the process returns to S412; otherwise (YES in the determination), the process advances to S413.

In S413, the conveyance roller 5 is stopped.

Note that in this embodiment, processing of canceling the overlapping state of the preceding and succeeding print media P is exemplified as exception processing, but the example of exception processing is not limited to this. For example, by the wait operation described above, during a separating operation, while the succeeding print medium P (Nth print medium P) is made to wait, the preceding print medium P ((N−1)th print medium P) may be conveyed until the separating operation is completed. Alternatively, the overlap amount W may be reduced by conveying the preceding print medium P by a predetermined amount after printing of the last line is completed. These operations may be combined with other modes without departing from the gist.

<Separating Operation>

Figure 15:
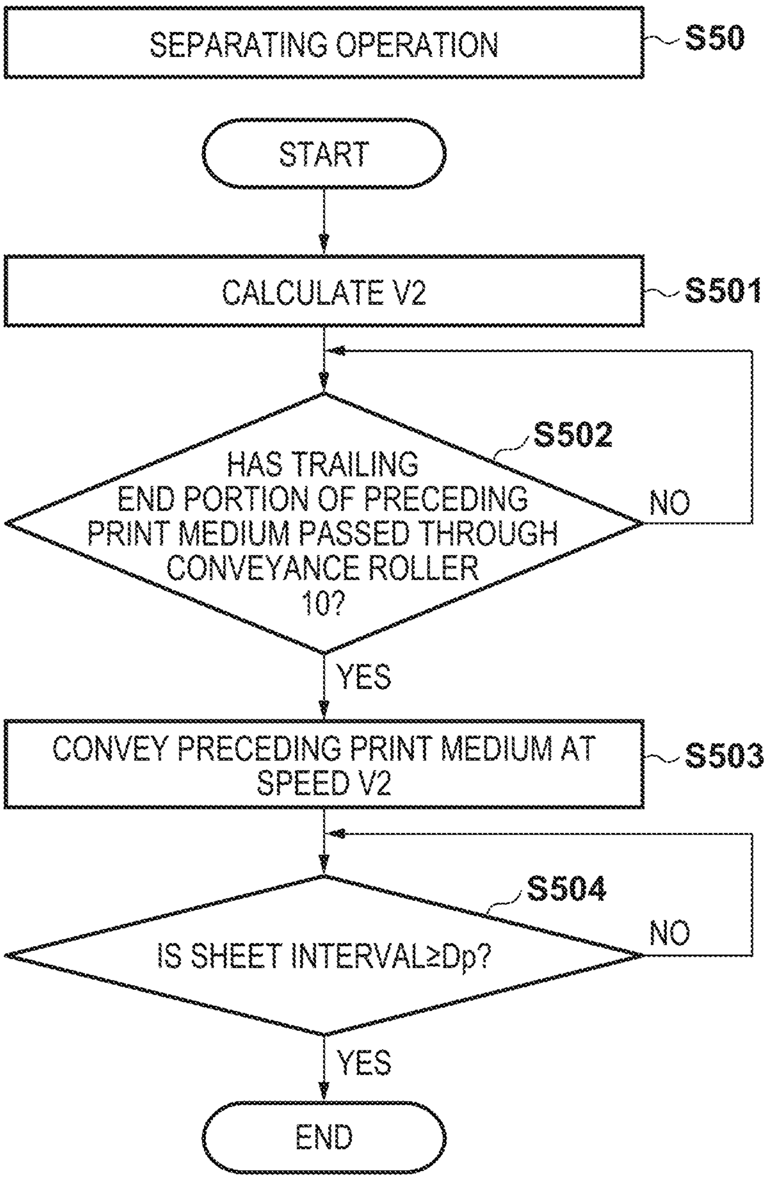
FIG. 15 is a flowchart showing an example of a separating operation.

FIG. 15 is a flowchart showing an example of separating operation S50.

In S501, the conveying speed V2 of the preceding print medium P is calculated (V2=Lh/Tmax, V2≤V2max).

In S502, it is determined whether the trailing end portion of the preceding print medium P has passed through the conveyance roller 10 (that is, the upstream roller used for a separating operation). If the trailing end portion of the preceding print medium P has not passed through the conveyance roller 10 (NO in the determination), the process returns to S502; otherwise (YES in the determination), the process advances to S503.

In S503, the conveyance roller 20 (the downstream roller used for a separating operation) is driven and rotated, thereby conveying the preceding print medium P at the speed V2 (≤V2max).

In S504, it is determined whether the sheet interval between the trailing end portion of the preceding print medium P and the leading end portion of the succeeding print medium P after the separating operation is equal to or larger than Dp. If the sheet interval is smaller than Dp (NO in the determination), the process returns to S504; otherwise (YES in the determination), this flowchart is terminated.

In this embodiment, if YES in the determination in S504 (if the sheet interval between the trailing end portion of the preceding print medium P and the leading end portion of the succeeding print medium P after the separating operation is equal to or larger than Dp), the separating operation is considered to be completed. However, another termination condition may be provided. For example, the separating operation may be considered to be completed when the trailing end portion of the preceding print medium P reaches the conveyance roller 20, or the separating operation may be considered to be completed when the trailing end of the print medium P1 passes through an arbitrary point set in advance.

The conveying speed exemplified in the above description is substantially a constant speed in this embodiment, but may be an average speed in consideration of a stop and acceleration.

Example 2

<Nozzle Shift Operation According to Example 2>

In Example 1 described above, the mode of performing a nozzle shift operation with respect to the preceding print medium P has been exemplified. Example 2 is different from Example 1 mainly in that a nozzle shift operation is performed with respect to the succeeding print medium P.

Figure 17A:
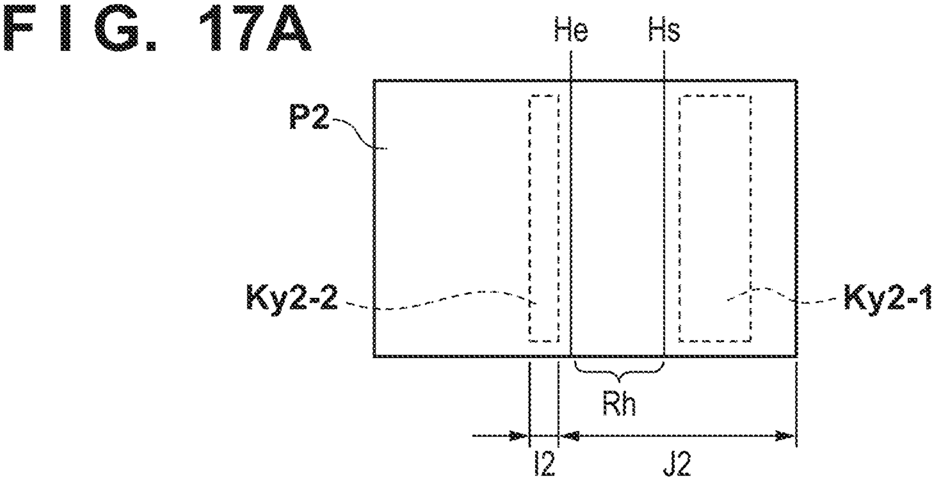
FIGS. 17A to 17C are schematic top views each showing the relative positional relationship regarding the succeeding print medium.

FIG. 17A is a schematic top view showing the relative positional relationship among a to-be-printed region Ky2-1 by the first scanning, a to-be-printed region Ky2-2 by the second scanning, and the separation region Rh therebetween in the succeeding print medium P2.

Figure 17B:
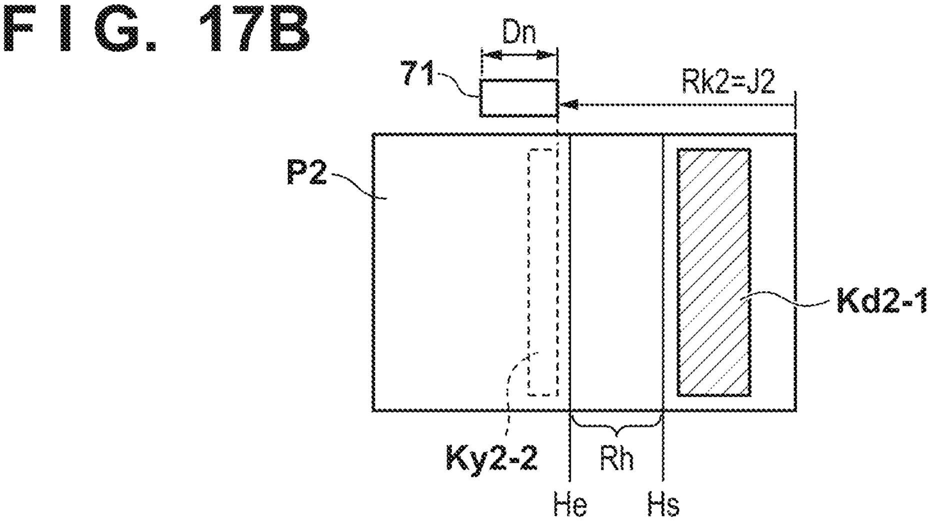

FIG. 17B is a schematic top view showing the relative positional relationship in a case where a nozzle shift operation is not performed. FIG. 17B also shows the nozzle 71, and shows that the to-be-printed region Ky2-1 has changed to a printed region Kd2-1 by printing. In this example, the most downstream side of the nozzle 71 is used for printing on the to-be-printed region Ky2-2 (although described in detail later, the to-be-printed region Ky2-2 will change to a printed region Kd2-2 by printing).

Figure 17C:
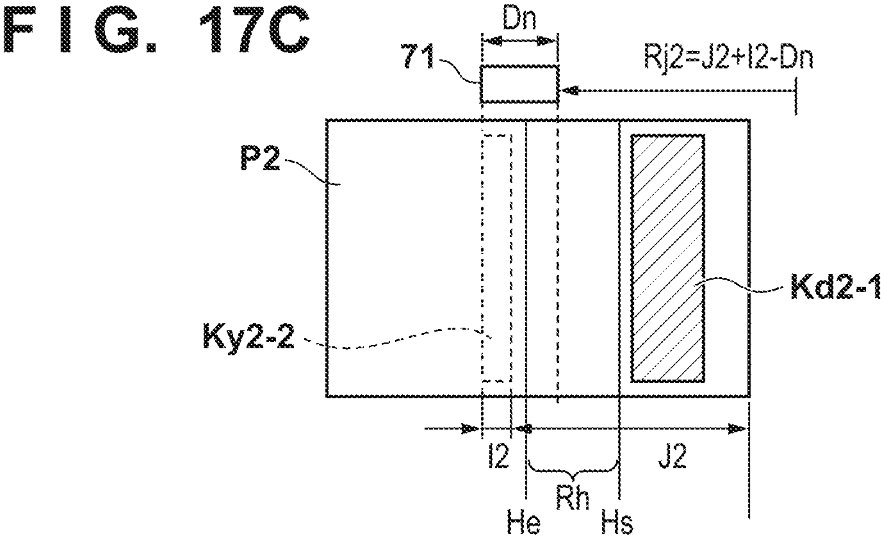

FIG. 17C is a schematic top view showing the relative positional relationship in a case where a nozzle shift operation is performed. This example is different from the example shown in FIG. 17B in that the most upstream side of the nozzle 71 is used for printing on the to-be-printed region Ky2-2.

As has been described above (see FIG. 7C), the separation region Rh corresponds to the region between the position Hs (=W+Dr) and the position He (=L−Dp+Dr). Here, the nozzle position (the distance from the leading end of the print medium P2 to the nozzle 71) when performing printing on the to-be-printed region Ky2-2 by the most downstream side of the nozzle 71 is expressed as a position Rk2 (see FIG. 17B). Similarly, the nozzle position when performing printing on the to-be-printed region Ky2-2 by the most upstream side of the nozzle 71 is expressed as a position Rj2 (see FIG. 17C).

That is, upon the second scanning accompanying a nozzle shift operation, it can be said that the nozzle position can be adjusted within a range from Rk2 to Rj2.

Here, the position of the second scanning for the succeeding print medium P2 (the distance from the leading end of the print medium P2 to this position) is expressed as a position J2. In this case, since the position J2 of the second scanning matches the position of the most downstream side of the nozzle 71, it can be expressed as (see FIG. 17B):

$$Rk2 = J2$$

When the print width (printing width) of the second scanning is expressed as a distance I2, by using the distance Dn (the length of the nozzle 71) and the printing width I2, it can be expressed as (see FIG. 17C):

$$Rj2 = J2 + I2 - Dn$$

Figure 18A:
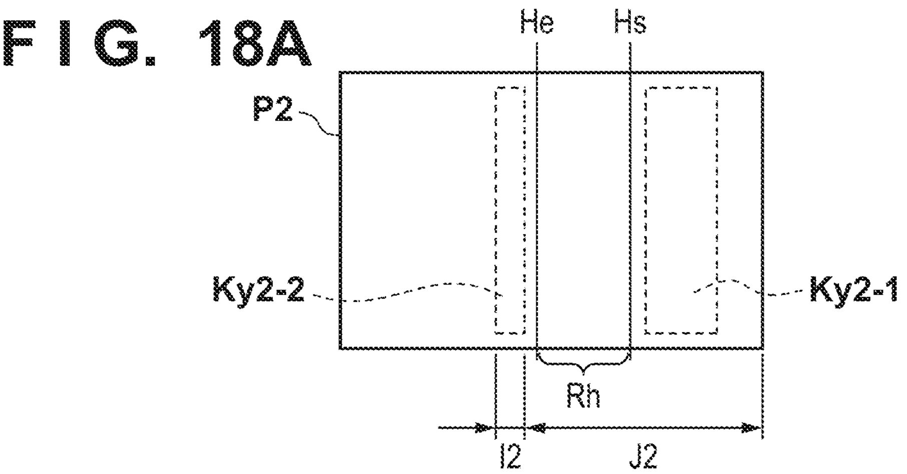
FIGS. 18A to 18C are schematic top views showing a mode of the separating operation not accompanying the nozzle shift operation.
Figure 18B:
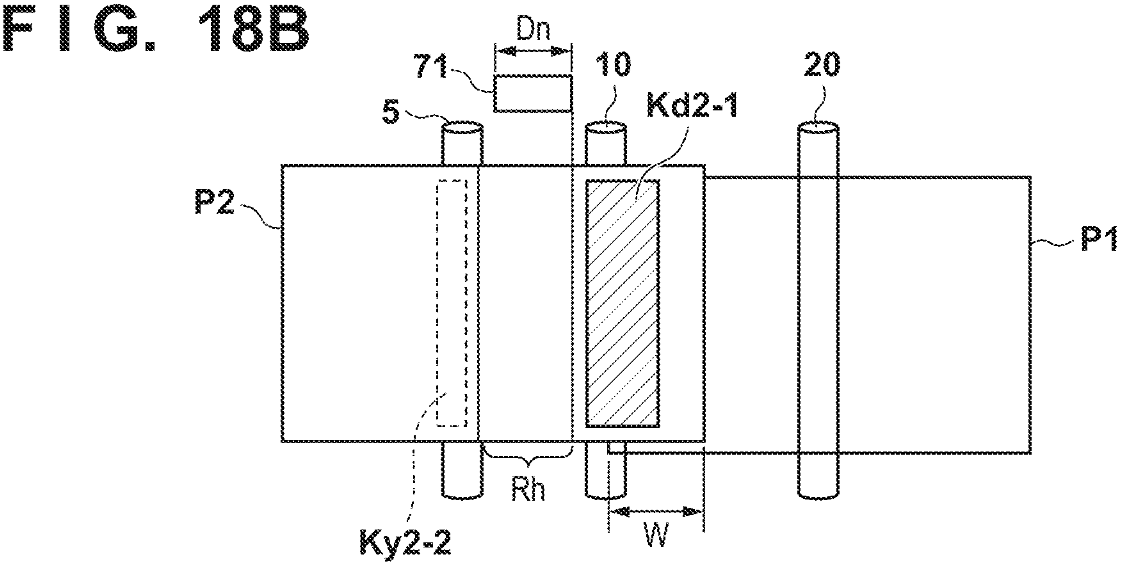
Figure 18C:
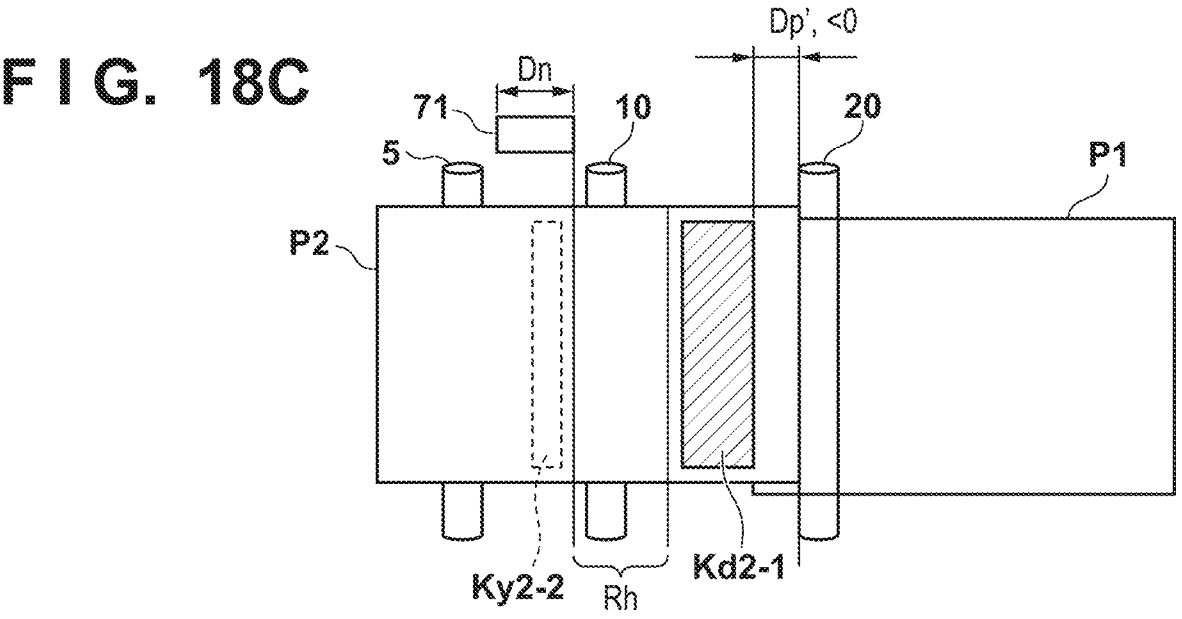

FIGS. 18A to 18C show an example of a case where the previous separating operation (a separating operation not accompanying a nozzle shift operation) is performed with respect to the succeeding print medium P2. FIG. 18A shows a mode similar to that in FIG. 17A, which is shown for comparison with FIGS. 18B and 18C. FIG. 18B shows the timing when a separating operation is started, together with the preceding print medium P1. FIG. 18C shows a state in which the separating operation is not properly completed.

When a nozzle shift operation is not performed, since the most downstream side of the nozzle 71 is used for each scanning printing, the most downstream side of the nozzle 71 is not included in the to-be-printed region Ky2-2 between the state shown in FIG. 18B and the state shown in FIG. 18C. That is, the conveyance stop (conveyance stop associated with scanning printing) of the print medium P2 is not performed in the separation region Rh, and the time of a separating operation does not include the conveyance stop time due to scanning printing on the to-be-printed region Ky2-2.

In this case, in order to implement separation, it can be required to separate the preceding print medium P1 at a relatively high conveying speed. On the other hand, in this embodiment, the conveying speed V2 is provided with the upper limit speed V2max. Therefore, as exemplarily shown in FIG. 18C, it is difficult to complete the separation of the print medium P1 and the print medium P2 within the period, and when the trailing end portion of the preceding print medium P1 passes through the conveyance roller 20, the print media P1 and P2 can remain in the overlapping state (a sheet interval Dp'<0).

Figure 19A:
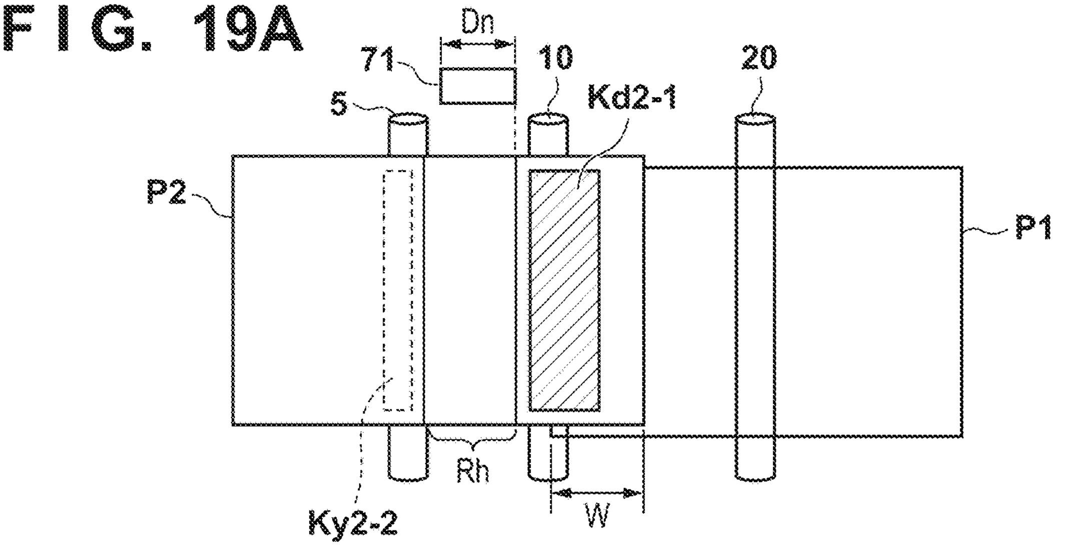
FIGS. 19A to 19C are schematic top views showing a mode of the separating operation accompanying the nozzle shift operation.
Figure 19B:
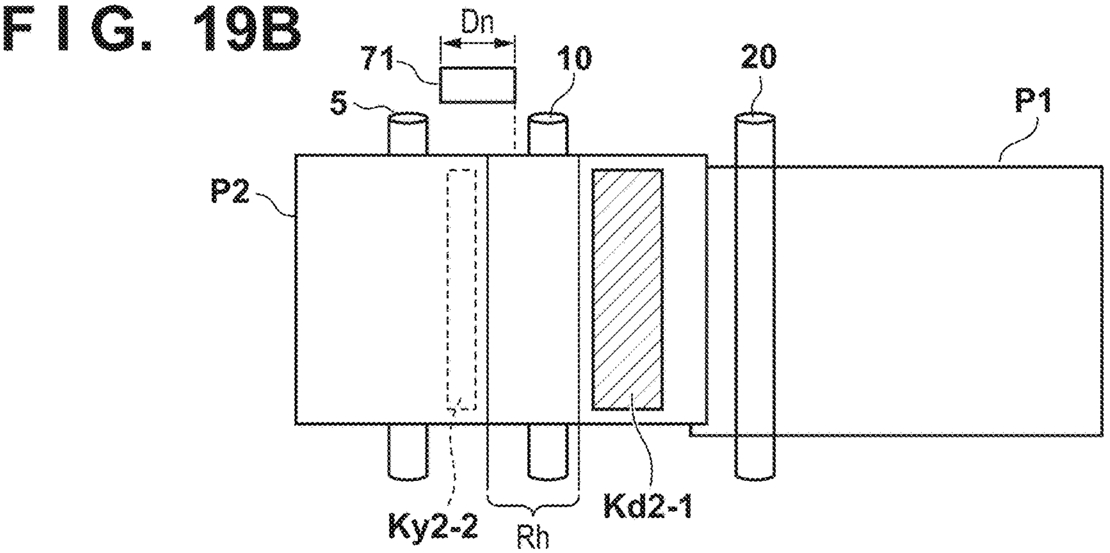
Figure 19C:
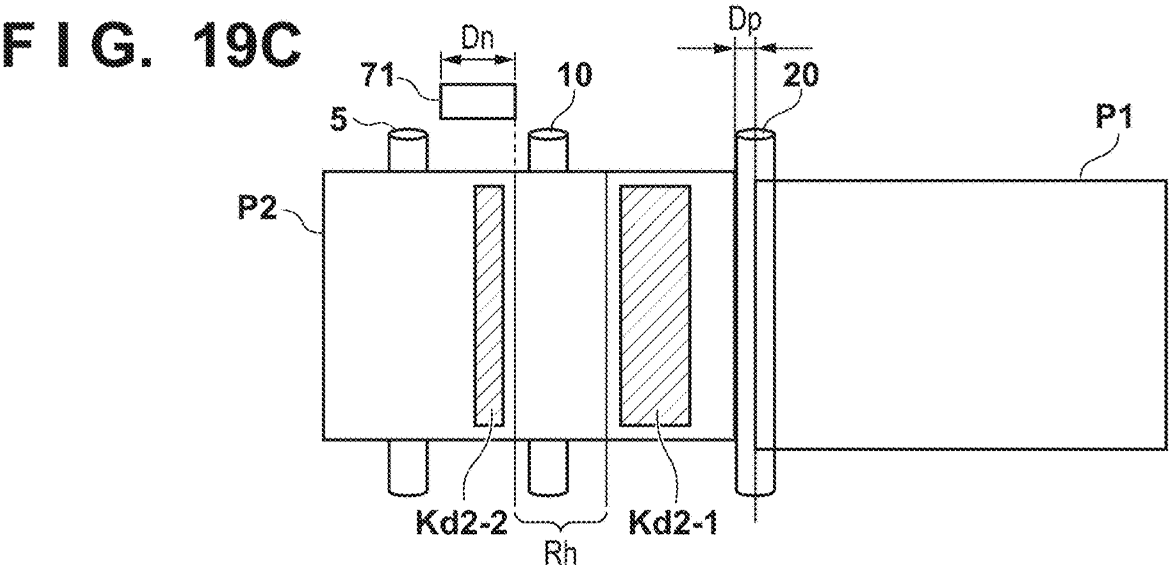

FIGS. 19A to 19C show an example of a case where a separating operation accompanying a nozzle shift operation is performed with respect to the succeeding print medium P2. FIG. 19A shows the timing when a separating operation is started. FIG. 19B shows scanning printing on the to-be-printed region Ky2-2. FIG. 19C shows the timing when the separating operation is completed.

When executing a nozzle shift operation upon the second scanning (see FIG. 19B), the driving range of the nozzle 71 is adjusted so that the upstream side of the nozzle 71 is used, and the conveyance amount in intermittent conveyance of the conveyance rollers 5 and 10 is adjusted accordingly.

Figure 20A:
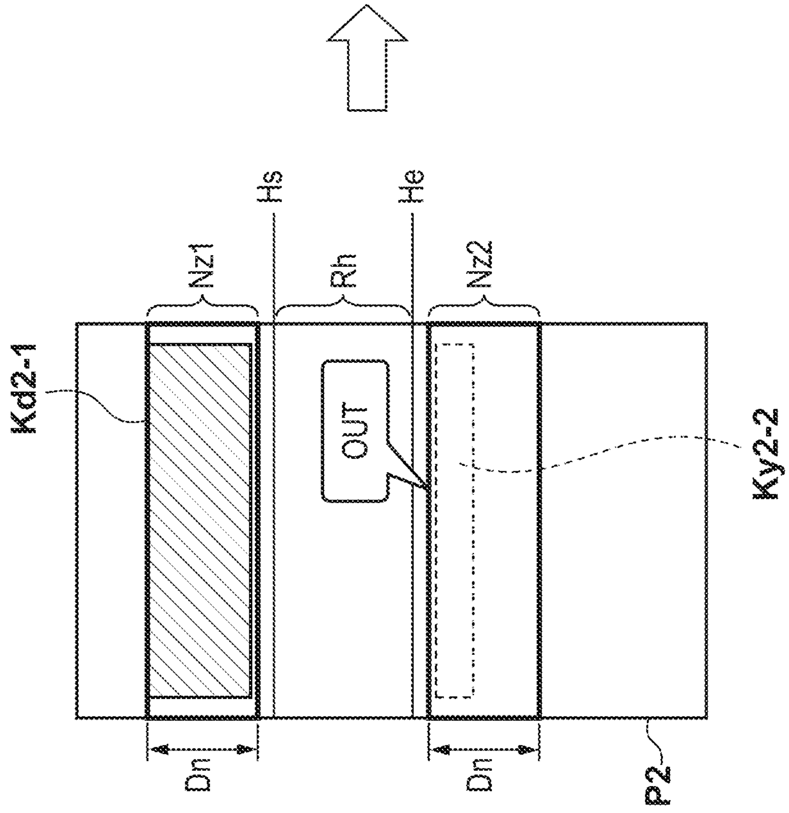
FIGS. 20A and 20B are schematic top views showing the relative positional relationship regarding the succeeding print medium.

FIG. 20A is a schematic top view showing the relative positional relationship among the separation region Rh, the regions Kd2-1 and Ky2-2, and the nozzle 71 in a case where a nozzle shift operation is not performed. Similarly, FIG. 20B is a schematic top view showing the relative positional relationship in a case where a nozzle shift operation is performed.

Figure 20B:
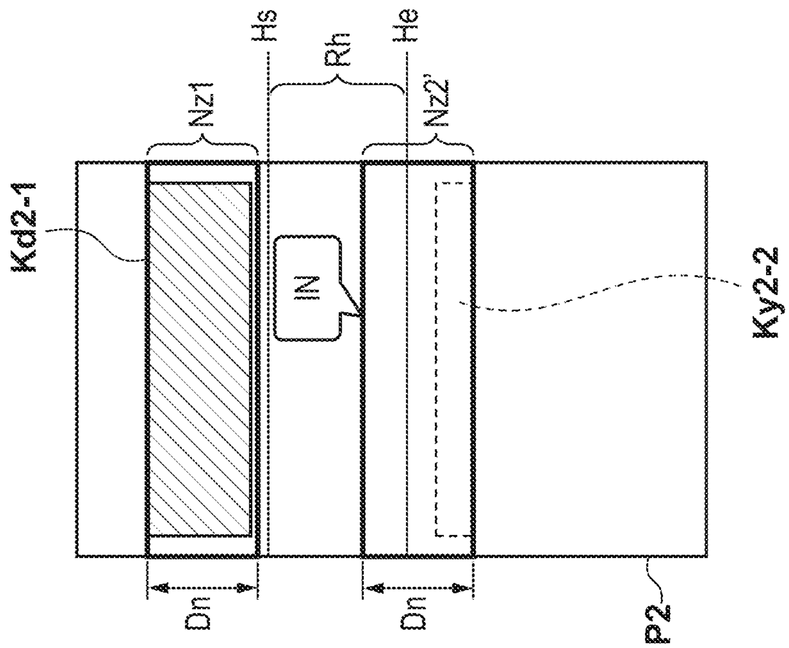

A nozzle range Nz1 in FIGS. 20A and 20B corresponds to the printable range of the nozzle 71 upon the first scanning. A nozzle range Nz2 corresponds to the printable range of the nozzle 71 upon the second scanning not accompanying a nozzle shift operation. A nozzle range Nz2' corresponds to the printable range of the nozzle 71 upon the second scanning accompanying a nozzle shift operation.

When a nozzle shift operation is not performed, the to-be-printed region Ky2-2 is located on the downstream side of the nozzle range Nz2 (see FIG. 20A). When a nozzle shift operation is performed, the to-be-printed region Ky2-2 is located on the upstream side of the nozzle range Nz2' (see FIG. 20B). As can be seen from comparison of FIGS. 20A and 20B, by performing a nozzle shift operation, a conveyance stop operation of the print medium P2 associated with scanning printing can be added in the separation region Rh. That is, a conveyance stop time due to scanning printing on the to-be-printed region Ky2-2 can be added during execution of a separating operation.

By performing a nozzle shift operation as described above, the time required for a separating operation can be substantially extended, and this can suppress or reduce the conveying speed V2 to the upper limit speed V2max or less with relative ease (as compared to a case of not performing a nozzle shift operation). As a result, as shown in FIG. 19C, a separating operation can be properly implemented.

Figure 21A:
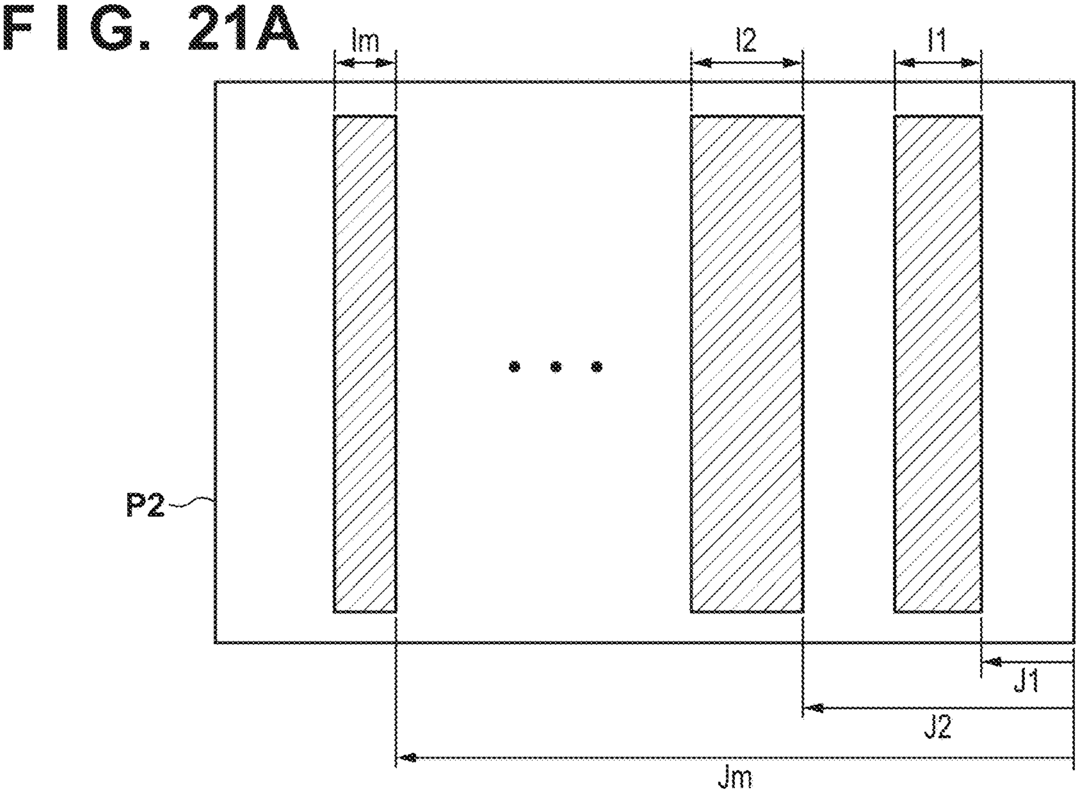
FIGS. 21A and 21B are schematic top views showing the printing mode in the succeeding print medium.

FIG. 21A shows, as a reference example, a mode in which a nozzle shift operation is not performed and 1 to m scanning printing operations are assigned. The printing widths of the scanning printing operations are shown as widths I1, I2, . . . , Im, respectively. The scanning positions of the scanning printing operations are shown as positions J1, J2, . . . , Jm.

Figure 21B:
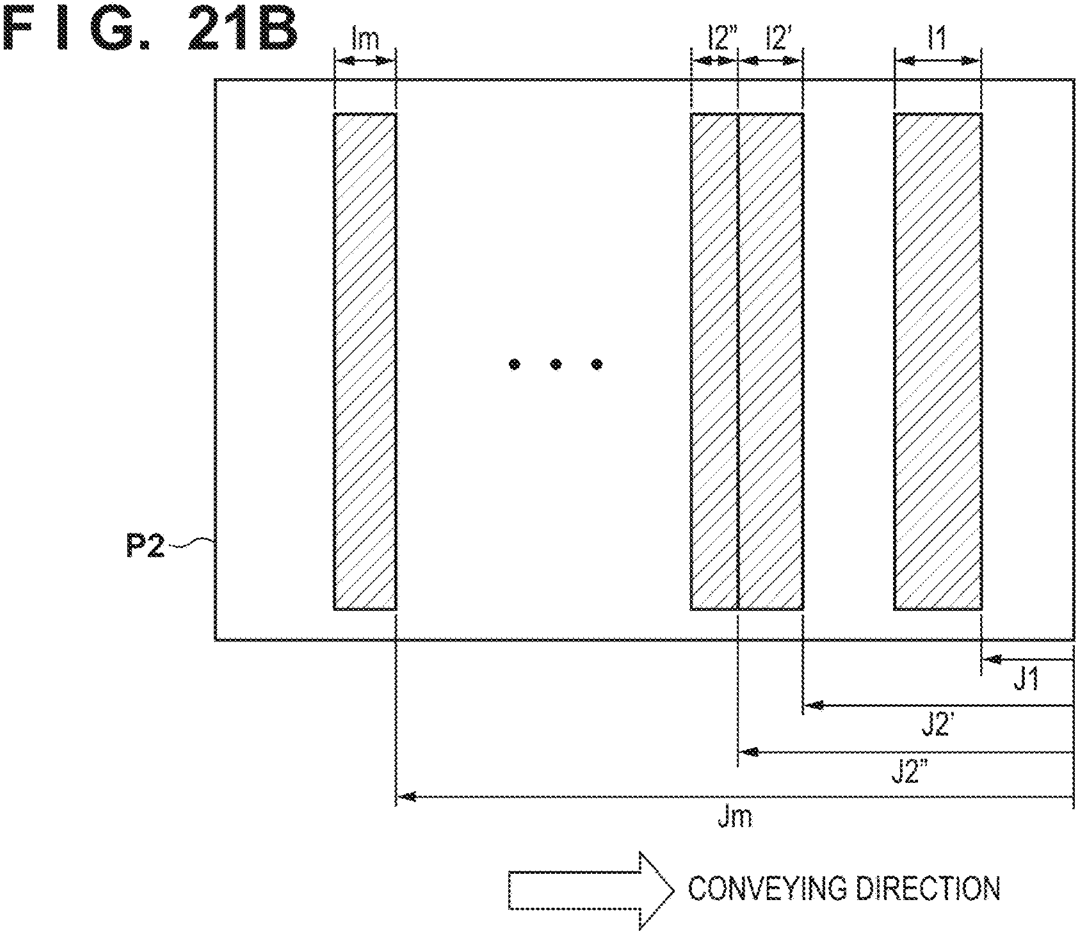

FIG. 21B shows, as a reference example, a mode in which a nozzle shift operation is performed, and the assignment of the scanning printing operations exemplarily shown in FIG. 21A is changed to divide the printing width I2 for the second scanning into printing widths I2' and I2". The scanning positions in this case are shown as positions J2' and J2", respectively.

In this case, printing which could be implemented with one scanning printing operation by the second scanning is now implemented by two scanning printing operations, so that the total number of scans (the number of scans in total) increases by performing a nozzle shift operation. Since the conveyance stop time of the print medium P is added, the printing required time required to complete printing on the entire print medium P can increase. This can also cause a deterioration in efficiency of printing processing (productivity of printed products).

Therefore, in this embodiment, a nozzle shift operation is executed so as not to increase the total number of scans per one print medium P.

For the second scanning (the second scanning performed outside the separation region Rh) performed in a case of not performing nozzle shift, a determination as to whether scanning printing in the separation region Rh can be added by performing a nozzle shift operation can be performed based on whether a parameter Rs2 (to be described later) exists. That is, this determination can be performed based on whether Rs2 (Rj2≤Rs2≤Rk2) satisfying Hs≤Rs2≤He exists (in the following description, this condition can be expressed as a scanning printing addition enable condition).

For example, in the example shown in FIG. 17C, since Hs≤Rj2≤He, it can be said that Rs2 satisfying the above-described scanning printing addition enable condition exists. Accordingly, it can be determined that scanning printing in the separation region Rh can be added by performing a nozzle shift operation upon the second scanning. The details of the determination processing will be described later.

Figures 22A, 22B:
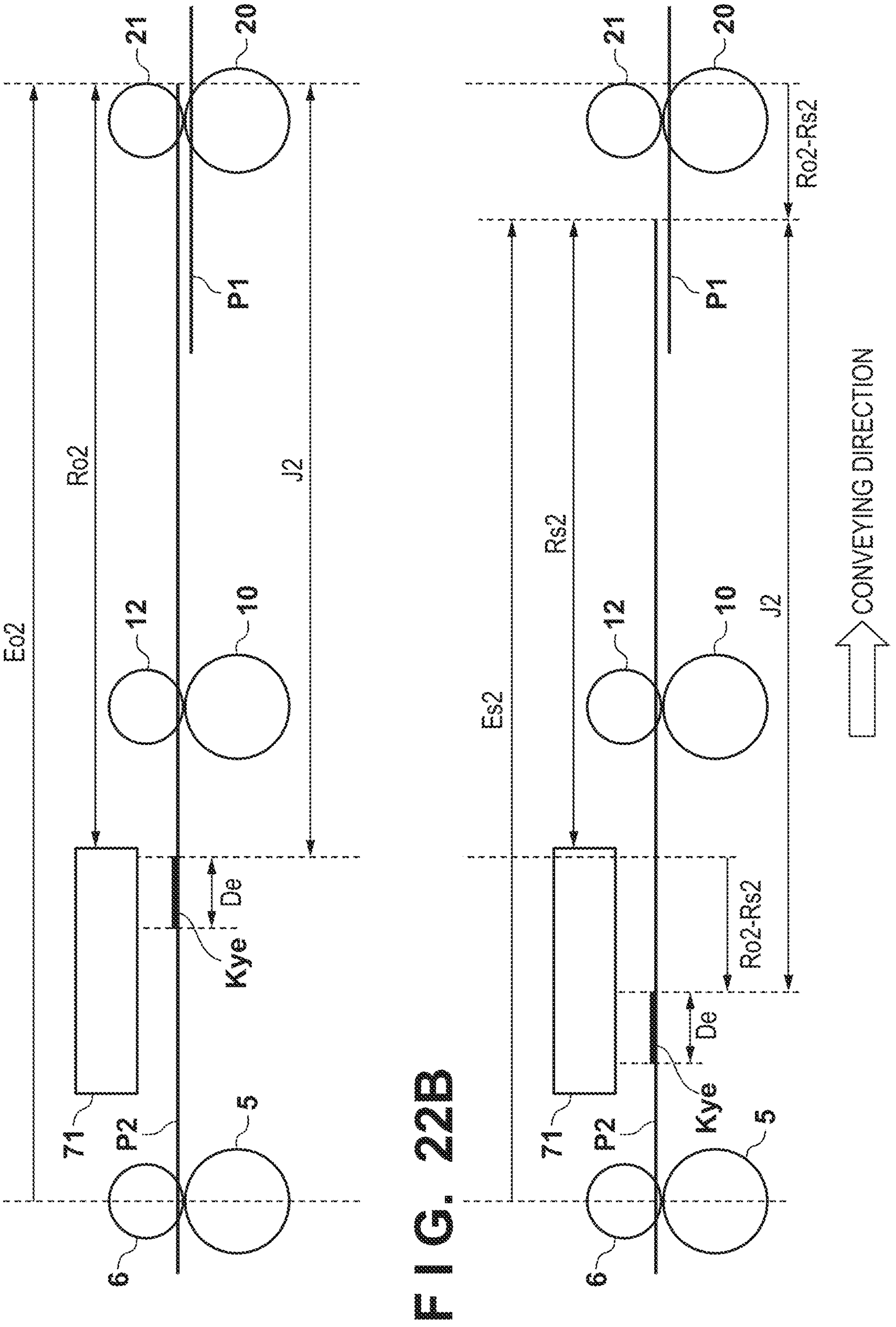
FIGS. 22A and 22B are schematic top views showing the relative positional relationship regarding the succeeding print medium.

FIGS. 22A and 22B are schematic views for explaining the conveyance amount and the adjustment amount of the driving range of the nozzle 71 associated with a nozzle shift operation. FIG. 22A shows a case where a nozzle shift operation is not performed (a case where scanning printing is performed using the most downstream side of the nozzle 71). FIG. 22B shows a case where a nozzle shift operation is performed (a case where the driving range of the nozzle 71 is adjusted to the upstream side).

In the example shown in FIG. 22A (the example of not performing a nozzle shift operation), let Ro2 be the distance from the leading end of the print medium P2 to the nozzle 71 (the position of the most downstream side) upon the second scanning. Let Eo2 be the conveyance amount until the second scanning is performed after the print medium P2 passes through the conveyance roller 5.

Similarly, in the example shown in FIG. 22B (the example of performing a nozzle shift operation), let Rs2 be the distance from the leading end of the print medium P2 to the nozzle 71 upon the second scanning. Let Es2 be the conveyance amount until the second scanning is performed after the print medium P2 passes through the conveyance roller 5.

Note that the distance from the conveyance roller 5 to the leading end of the print medium P2 upon the second scanning is equal to the conveyance amount until the second scanning is performed after the print medium P2 passes through the conveyance roller 5.

As can be seen from comparison of FIGS. 22A and 22B, when a nozzle shift operation is performed, the leading end of the print medium P2 upon performing the second scanning is shifted to the upstream side by Ro2–Rs2. Hence, the conveyance amount Es2 in the case of performing a nozzle shift operation is set by subtracting Ro2–Rs2 from the conveyance amount Eo2 in the case of not performing a nozzle shift operation. That is, the conveyance amount Es2 is expressed as:

$$Es2 = Eo2 - (Ro2 - Rs2)$$

In accordance with this, the driving range of the nozzle 71 used in the second scanning is adjusted to be shifted to the upstream side by Ro2–Rs2.

<Control Contents at Time of Execution of Separating Operation>

When executing a printing operation accompanying a nozzle shift operation according to Example 2, in flowchart S30 exemplarily shown in FIG. 9, overlapping preparation operation S40, nozzle shift calculation processing S70, and separating operation S50 can be changed as exemplarily shown in FIGS. 23, 24, and 29 described later, respectively. Additionally, adjustment processing S90 (see FIG. 28) (to be described later) is inserted after S310 and before S311. Thus, adjustment of the conveyance amount of the print medium P and adjustment of the driving range of the nozzle 71 can be performed.

<Overlapping Preparation Operation>

Figure 23:
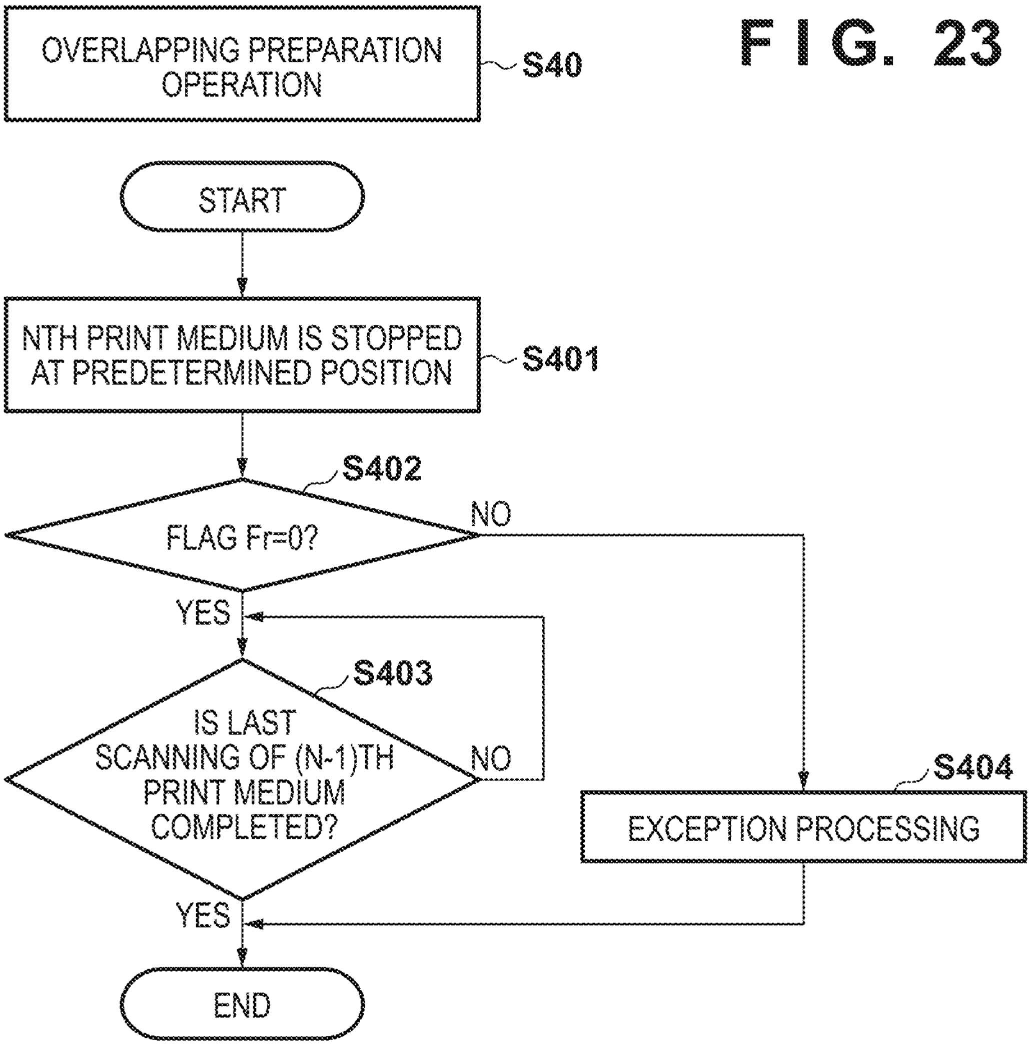
FIG. 23 is a flowchart showing an example of an overlapping preparation operation.

FIG. 23 is a flowchart showing an example of overlapping preparation operation S40.

In S401, based on the detection result of the detection sensor 16 and the rotation amount of the feed roller 3, the Nth print medium is stopped at a predetermined position ahead of the conveyance roller 5.

In S402, it is determined whether the exception processing flag Fr indicating whether to perform exception processing is set to Fr=0 (Fr=0 indicates that no exception processing is executed, and Fr=1 indicates that exception processing is executed). If Fr=0 (YES in the determination), the process advances to S403; otherwise (NO in the determination), the process advances to S404.

In S403, it is determined whether the last scanning of the printhead 7 with respect to the (N−1)th print medium is completed. If the last scanning is completed (YES in the determination), flowchart S40 is terminated and the process advances to S308 of FIG. 9; otherwise (NO in the determination), the process returns to S403.

In S404, exception processing similar to that in Example 1 is performed.

<Nozzle Shift Calculation Processing>

Figure 24:
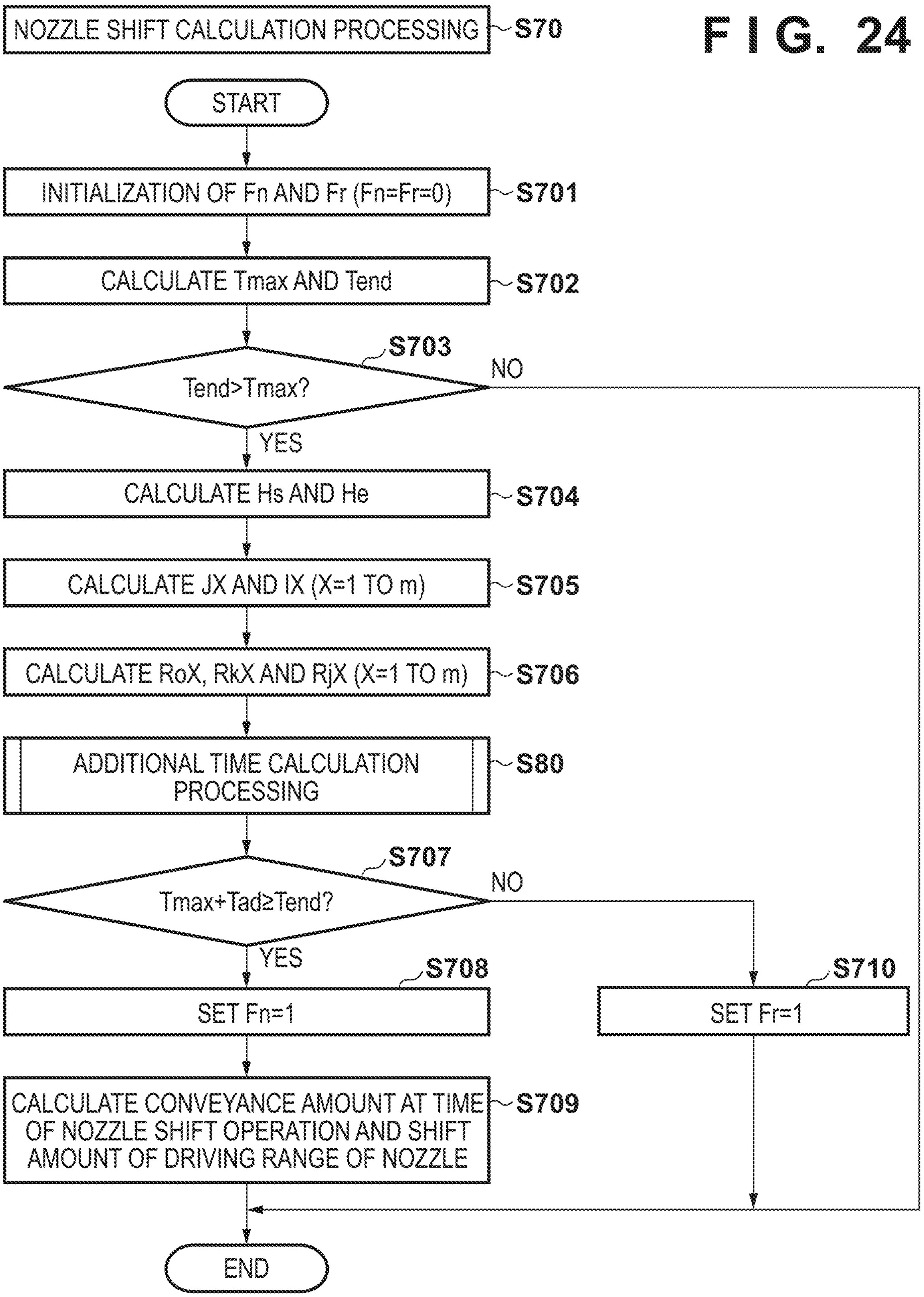
FIG. 24 is a flowchart showing an example of nozzle shift calculation processing.

FIG. 24 is a flowchart showing an example of nozzle shift calculation processing S70.

In S701, the nozzle shift execution flag Fn and the exception processing flag Fr are initialized as Fn=0 and Fr=0 (Fn=0 indicates that no nozzle shift operation is executed, Fn=1 indicates that a nozzle shift operation is executed, Fr=0 indicates that no exception processing is executed, and Fr=1 indicates that exception processing is executed).

In S702, the separation enable time Tmax and a separation required time Tend are calculated. The separation enable time Tmax corresponds to the time from the passage of the trailing end of the preceding print medium P through the conveyance roller 5 to the arrival of the leading end of the succeeding print medium P at the conveyance roller 10. The separation required time Tend corresponds to the time from the start of a separating operation to the arrival of the trailing end of the preceding print medium P at the conveyance roller 10 when the preceding print medium P is conveyed at the upper limit speed V2max. The separation enable time Tmax and the separation required time Tend can be expressed by using a distance L from the separation start position to the separation end position;

$$Tmax = Lh / V1 + Sc \times Ts$$

$$= (L - W - Dp) / V1 + Sc \times Ts$$

$$Tend = L / V2max$$

In S703, it is determined whether Tend>Tmax. If Tend>Tmax (YES in the determination), it is considered that a nozzle shift operation is required, and the process advances to S704; otherwise (NO in the determination, Tmax≥Tend), it is considered that a nozzle shift operation is not required, and this flowchart is terminated. Note that in this case, the nozzle shift execution flag Fn=0 (no nozzle shift operation is executed), and exception processing flag Fr=1 (exception processing is executed).

In S704, the positions Hs (=W+Dr) and He (=L−Dp+Dr) are calculated.

Figure 25A:
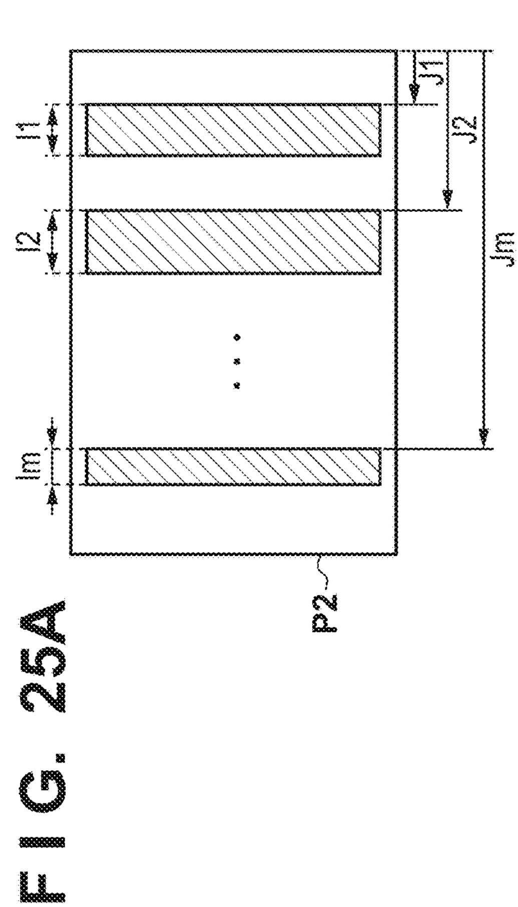
FIGS. 25A to 25D are schematic top views each showing an example of print regions of the succeeding print medium.

In S705, based on the print data for the succeeding print medium P, as exemplarily shown in FIG. 25A, a position JX and a printing width IX of the Xth scanning are calculated where X is an arbitrary integer from 1 to m.

Figure 25B:
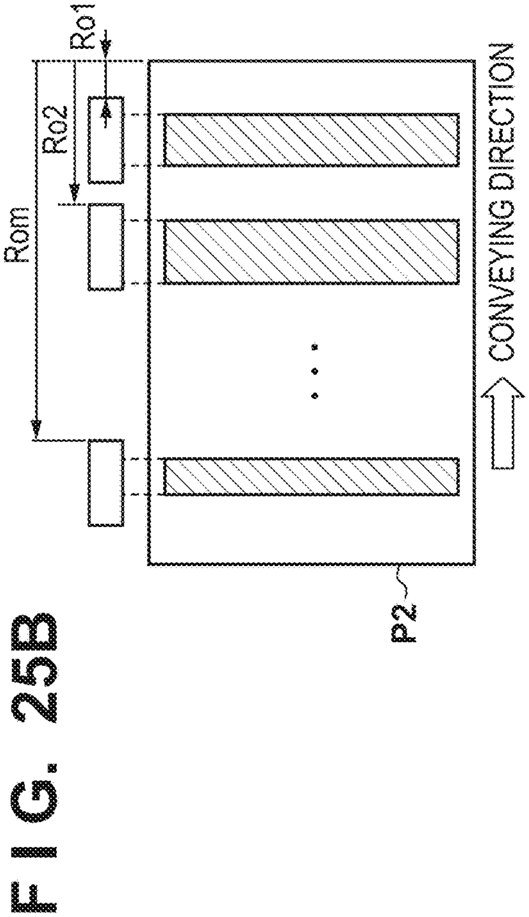
Figure 25C:
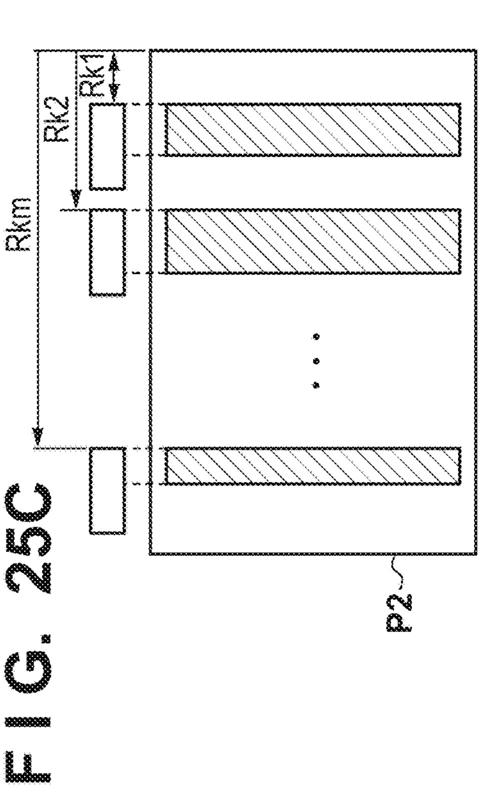
Figure 25D:
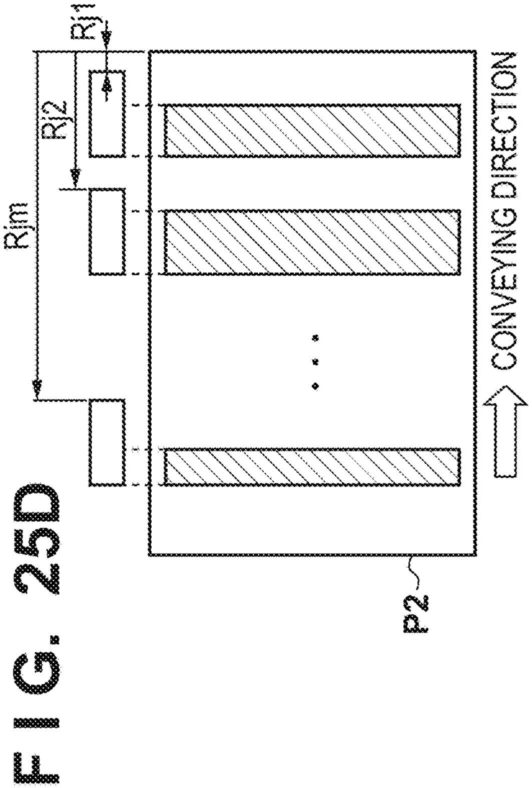

In S706, for the Xth scanning, based on the print data for the succeeding print medium P, as shown in FIG. 25B, a nozzle position RoX in a case of not performing a nozzle shift operation is calculated. In addition, as shown in FIG. 25C, a nozzle position RkX for performing scanning printing using the most downstream side of the nozzle 71 is calculated, and as shown in FIG. 25D, a nozzle position RjX for performing scanning printing using the most upstream side of the nozzle 71 is calculated. These nozzle positions can be calculated by using the nozzle length Dn and the position JX and printing width IX of scanning printing:

$$RkX = JX$$

$$RjX = JX + IX - Dn$$

Note that the above-described parameters (that is, Ro2, Rk2, and Rj2) when X=2 are as shown in FIGS. 17B and 17C and FIGS. 22A and 22B.

Thereafter, although described in detail later, additional time calculation processing S80 is performed for the Xth scanning of the succeeding print medium P, and a conveyance stop time Tad due to scanning printing added in the separation region Rh by a nozzle shift operation, and a nozzle position RsX are calculated. The conveyance stop time Tad corresponds to an additional time associated with addition of scanning printing.

Note that the above-described parameter (that is, Rs2) when X=2 is as shown in FIG. 22B.

In S707, it is determined whether Tmax+Tad≥Tend. If Tmax+Tad≥Tend (YES in the determination), it is considered that the preceding print medium P and the succeeding print medium P can be separated by executing a nozzle shift operation, and the process advances to S709; otherwise (NO in the determination, Tmax+Tad<Tend), it is considered that the separation by a nozzle shift operation is difficult, and the process advances to S710.

In S710, exception processing flag Fr=1 (exception processing is executed) is set, and this flowchart is terminated. Note that in this case, the nozzle shift execution flag Fn=0 (a nozzle shift operation is not executed), and exception processing flag Fr=1 (exception processing is executed).

In S708, nozzle shift execution flag Fn=1 (a nozzle shift operation is executed) is set.

In S709, a conveyance amount EsX in a case of performing a nozzle shift operation is calculated by subtracting RoX−RsX from a conveyance amount EoX in a case of not performing a nozzle shift operation:

$$EsX = EoX - (RoX - RsX)$$

According to this, the shift amount of the driving range of the nozzle 71 used in the X scanning to the upstream side is calculated as RoX-RsX (note that, depending on the result of RsX calculated in additional time calculation processing S80 to be described later, RoX−RsX=0 is possible). Note that in this case, nozzle shift execution flag Fn=1 (a nozzle shift operation is executed), and exception processing flag Fr=0 (exception processing is not executed).

<Additional Time Calculation Processing>

Figure 26:
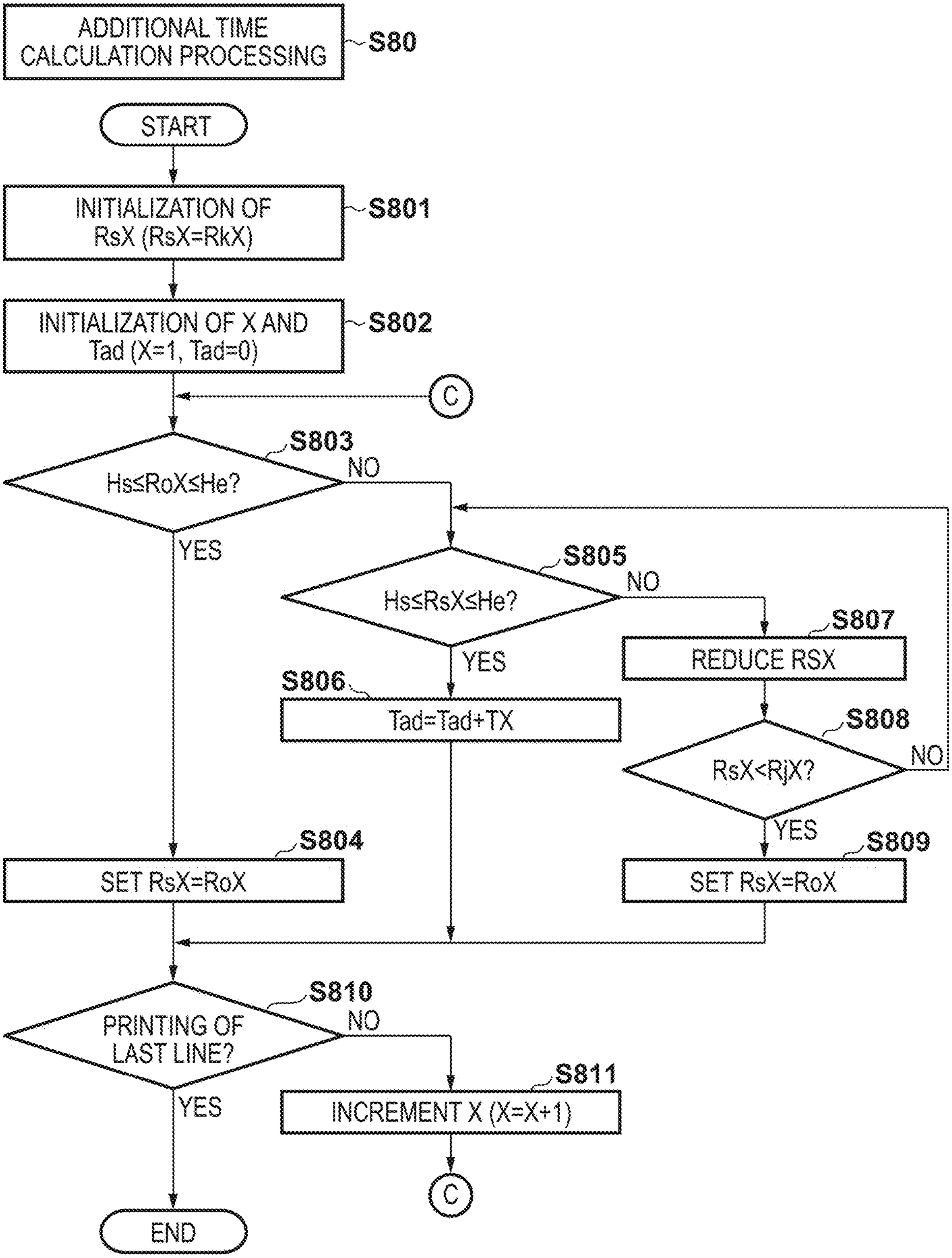
FIG. 26 is a flowchart showing an example of additional time calculation processing.

FIG. 26 is a flowchart showing an example of additional time calculation processing S80.

Figure 27A:
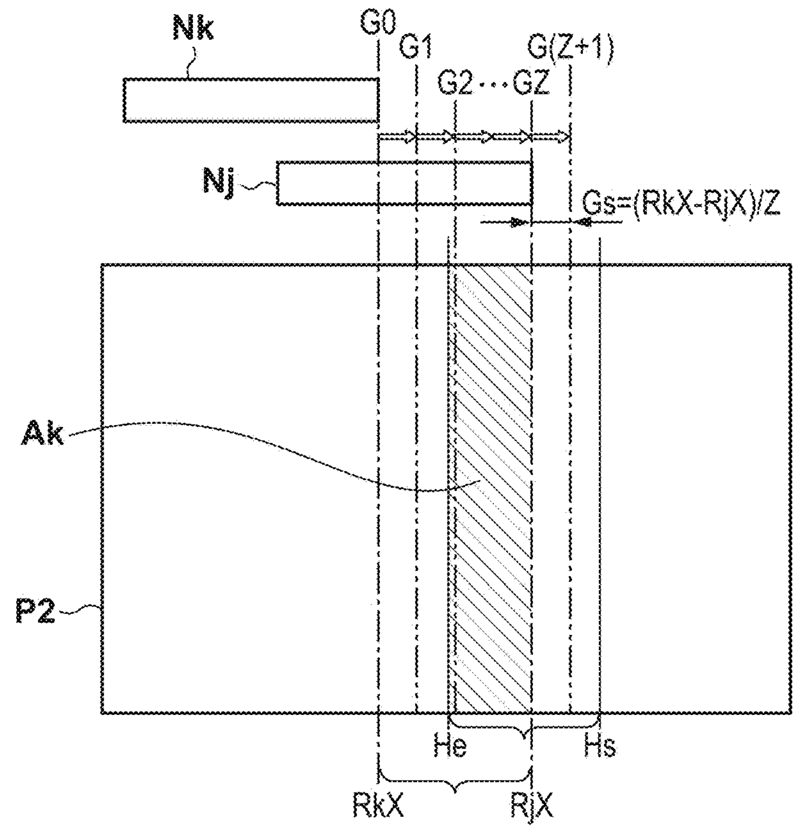
FIGS. 27A and 27B are schematic top views showing an example of the contents of the additional time calculation processing.
Figure 27B:
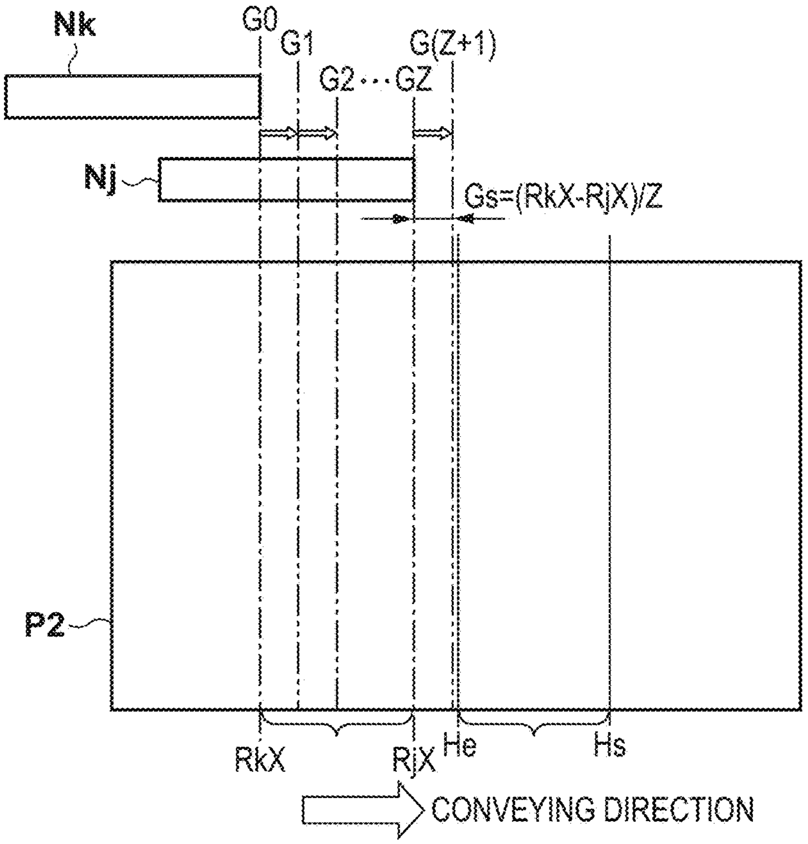

FIGS. 27A and 27B are schematic views for explaining that, by performing calculation while gradually changing the nozzle position, it is determined whether scanning printing can be added in the separation region Rh by a nozzle shift operation, and Tad and RsX are calculated. FIGS. 27A and 27B show the nozzle position RkX for performing scanning printing using the most downstream side of the nozzle 71 in the Xth scanning, and the nozzle position RjX for performing scanning printing using the most upstream side of the nozzle 71. A region Ak in FIG. 27A corresponds to the common region of the region between RjX and RkX and the region between the position Hs and the position He. The remaining details will be described later.

In S801, for the Xth scanning, the above-described nozzle position RsX is initialized with the nozzle position RkX for performing scanning printing using the most downstream side of the nozzle 71, thereby setting RsX=RkX.

In S802, X is initialized as X=1, and the conveyance stop time Tad due to scanning printing added in the separation region Rh by a nozzle shift operation is initialized as Tad=0.

In S803, for the Xth scanning, it is determined whether Hs≤ROX≤He. If Hs≤ROX≤He (YES in the determination), the process advances to S804; otherwise (NO in the determination), the process advances to S805.

In S804, RsX=RoX is set.

In S805, for the Xth scanning, it is determined whether Hs≤RsX≤He. If Hs≤RsX≤He (YES in the determination), the process advances to S806; otherwise (NO in the determination), the process advances to S807.

In S806, the conveyance stop time TX due to scanning printing of the Xth scanning is added to Tad. The conveyance stop time TX substantially corresponds to the scan time.

In S807, a predetermined amount is subtracted from the nozzle position RsX. The subtraction amount in this step is expressed as Gs=(RkX−RjX)/Z. In another example, the subtraction amount may be a value of an integer multiple of the pitch of the nozzle 71, a fixed value such as 0.1 mm or 1 mm, or may be a calculated value based on the number of subtractions (the number of repetitions of S805, S807, and S808).

In S808, it is determined whether RsX<RjX. If RsX<RjX (YES in the determination), the process advances to S809; otherwise (NO in the determination), the process returns to S805.

In S809, it is considered that, for the X scanning, scanning printing in the separation region Rh cannot be added by a nozzle shift operation, that is, a nozzle shift operation is not performed, and, for example, RsX=RoX is set.

S805, S807, and S808 described above are performed while repeating subtraction processing of the nozzle position RsX until it is determined in S805 that Hs≤RsX≤He. With this, it is determined whether scanning printing in the separation region Rh can be added by a nozzle shift operation.

As shown in FIG. 27A, the nozzle 71 used for scanning printing can be adjusted within a range from a mode Nk where the most downstream side is used to a mode Nj where the most upstream side is used. Repetition of subtraction processing in S807 corresponds to G0, G1, G2, . . . , GZ, G (Z+1) in FIG. 27A. In the example shown in FIG. 27A, the common region Ak exists. Accordingly, during the repetition of the subtraction processing in S807 (at the timing of G2 in this example), it is determined in S805 that Hs≤RsX (=RkX−Gs×2)≤He, that is, it is determined that scanning printing can be added in the separation region Rh. With this, the conveyance stop time TX due to scanning printing of the Xth scanning is added in S806.

On the other hand, in the example shown in FIG. 27B, the common region Ak does not exist. Accordingly, it is not determined in S805 that Hs≤RsX≤He even at the timing of GZ. Thereafter, when G(Z+1) is set in S807, it is not determined in S808 that RsX<RjX. As a result, in S809, considering that, for the Xth scanning, scanning printing in the separation region Rh cannot be added by a nozzle shift operation, RsX=RoX is set, and it is decided not to perform a nozzle shift operation.

In S810, it is determined whether the Xth scanning is for printing of the last line on the succeeding print medium P. If the Xth scanning is for the last line (YES in the determination), this flowchart is terminated; otherwise (NO in the determination), the process advances to S811.

In S811, the parameter X is incremented (X=X+1), and the process returns to S803.

<Adjustment Processing>

Figure 28:
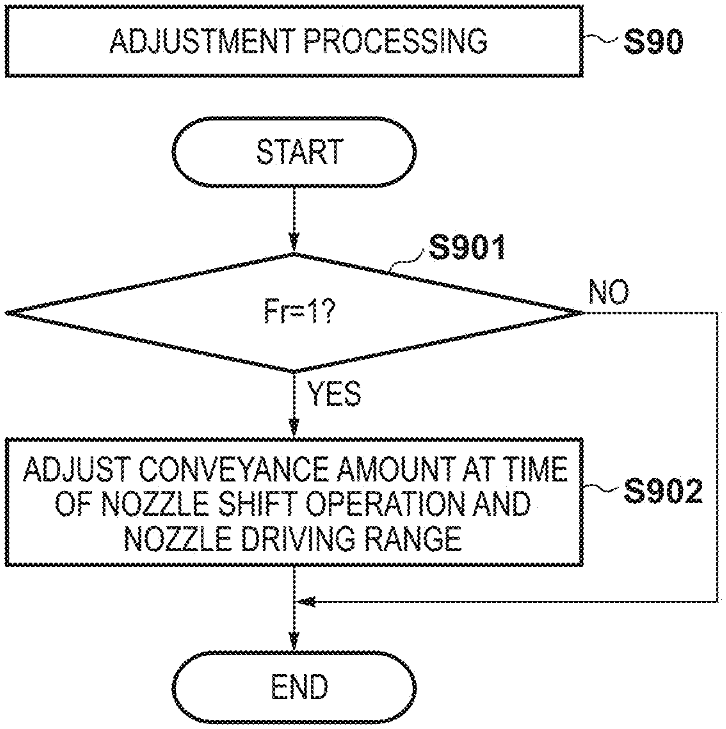
FIG. 28 is a flowchart showing an example of adjustment processing.

FIG. 28 is a flowchart showing an example of adjustment processing S90 inserted after S310 and before S311 of FIG. 9.

In S901, it is determined whether nozzle shift execution flag Fs=1. If nozzle shift execution flag Fs=1 (YES in the determination, a nozzle shift operation is executed), the process advances to S902; otherwise (NO in the determination), this flowchart is terminated.

In S902, adjustment of the conveyance amount and adjustment of the driving range of the nozzle 71 in a case of performing a nozzle shift operation are performed. The above-described conveyance amount EsX (see S709) is set to:

$$EsX = EoX - (RoX - RsX)$$

According to this, the driving range of the nozzle 71 used in each scanning printing is shifted to the upstream side by RoX-RsX.

<Separating Operation>

Figure 29:
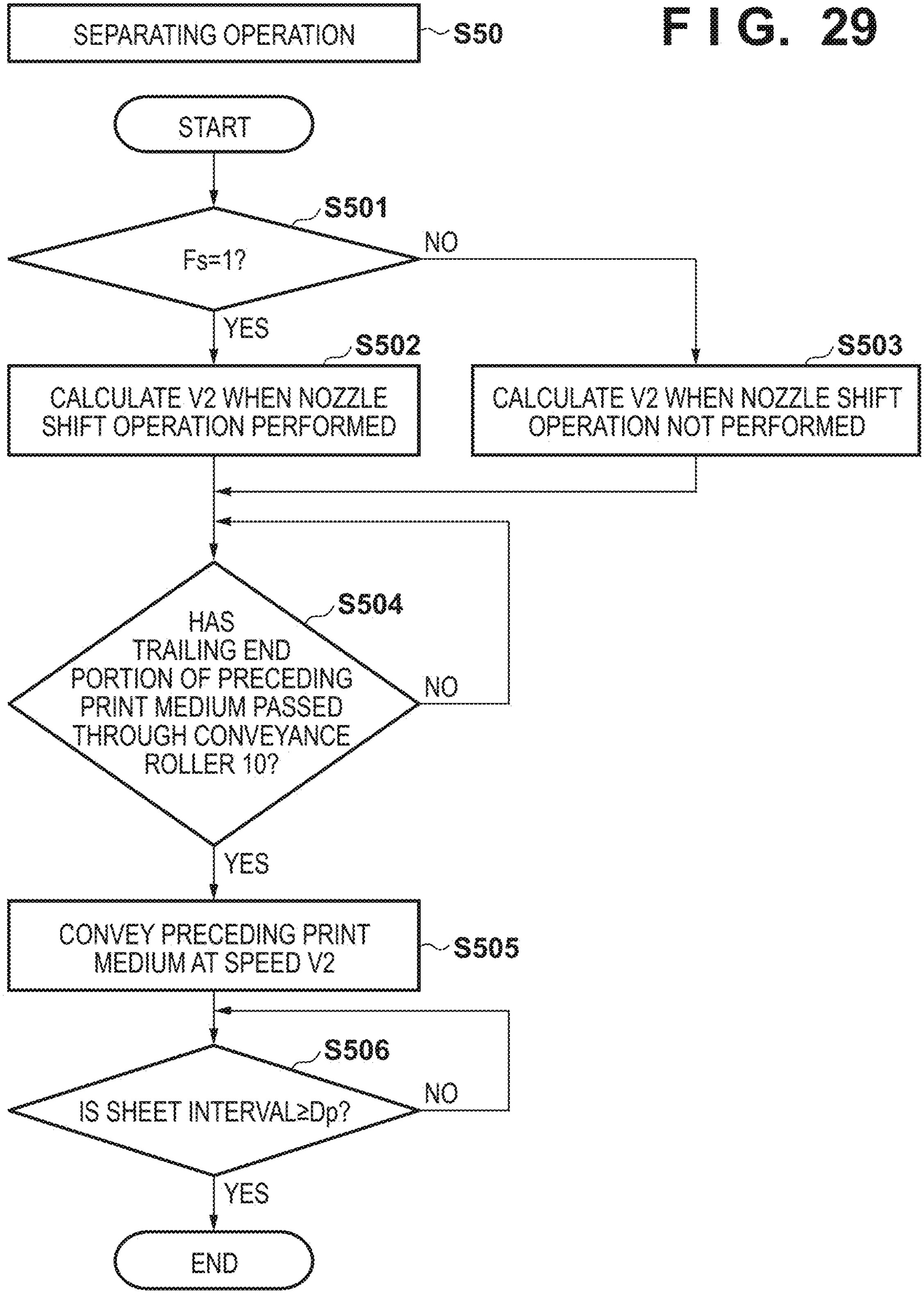
FIG. 29 is a flowchart showing an example of a separating operation.

FIG. 29 is a flowchart showing an example of separating operation S50.

In S501, it is determined whether nozzle shift execution flag Fs=1. If nozzle shift execution flag Fs=1 (YES in the determination, a nozzle shift operation is executed), the process advances to S502; otherwise (NO in the determination, a nozzle shift operation is not executed), the process advances to S503.

In S502, the conveying speed V2 of the preceding print medium P in a case of performing a nozzle shift operation is calculated (V2≤V2max). In this case, the conveyance speed V2 can be calculated as:

$$V2 = Lh/(T\text{max}+\text{Tad})$$

In S503, the conveying speed V2 of the preceding print medium P in a case of not performing a nozzle shift operation is calculated (V2≤V2max). In this case, the conveyance speed V2 can be calculated as:

$$V2 = Lh/T\text{max}$$

In S504, it is determined whether the trailing end portion of the preceding print medium P has passed through the conveyance roller 10 (that is, the upstream roller used for a separating operation). If the trailing end portion of the preceding print medium P has not passed through the conveyance roller 10 (NO in the determination), the process returns to S504; otherwise (YES in the determination), the process advances to S505.

In S505, the conveyance roller 20 (the downstream roller used for a separating operation) is driven and rotated, thereby conveying the preceding print medium P at the speed V2 (≤V2max).

In S506, it is determined whether the sheet interval between the trailing end portion of the preceding print medium P and the leading end portion of the succeeding print medium P after the separating operation is equal to or larger than Dp. If the sheet interval is smaller than Dp (NO in the determination), the process returns to S506; otherwise (YES in the determination), this flowchart is terminated.

Even with the mode described above, a separating operation can be properly implemented, and at that time, the preceding print medium P can be conveyed so as to allow the conveying speed V2 to meet a criterion. Therefore, it can be said that this example can also obtain an effect similar to that of Example 1.

Modification of Example 2

Calculation of the conveyance stop time Tad and the nozzle position RsX can also be implemented by other equivalent modes. For example, in nozzle shift calculation processing $70 exemplarily shown in FIG. 24, instead of additional time calculation processing S80, calculation or specification based on pattern matching may be performed.

Figure 30:
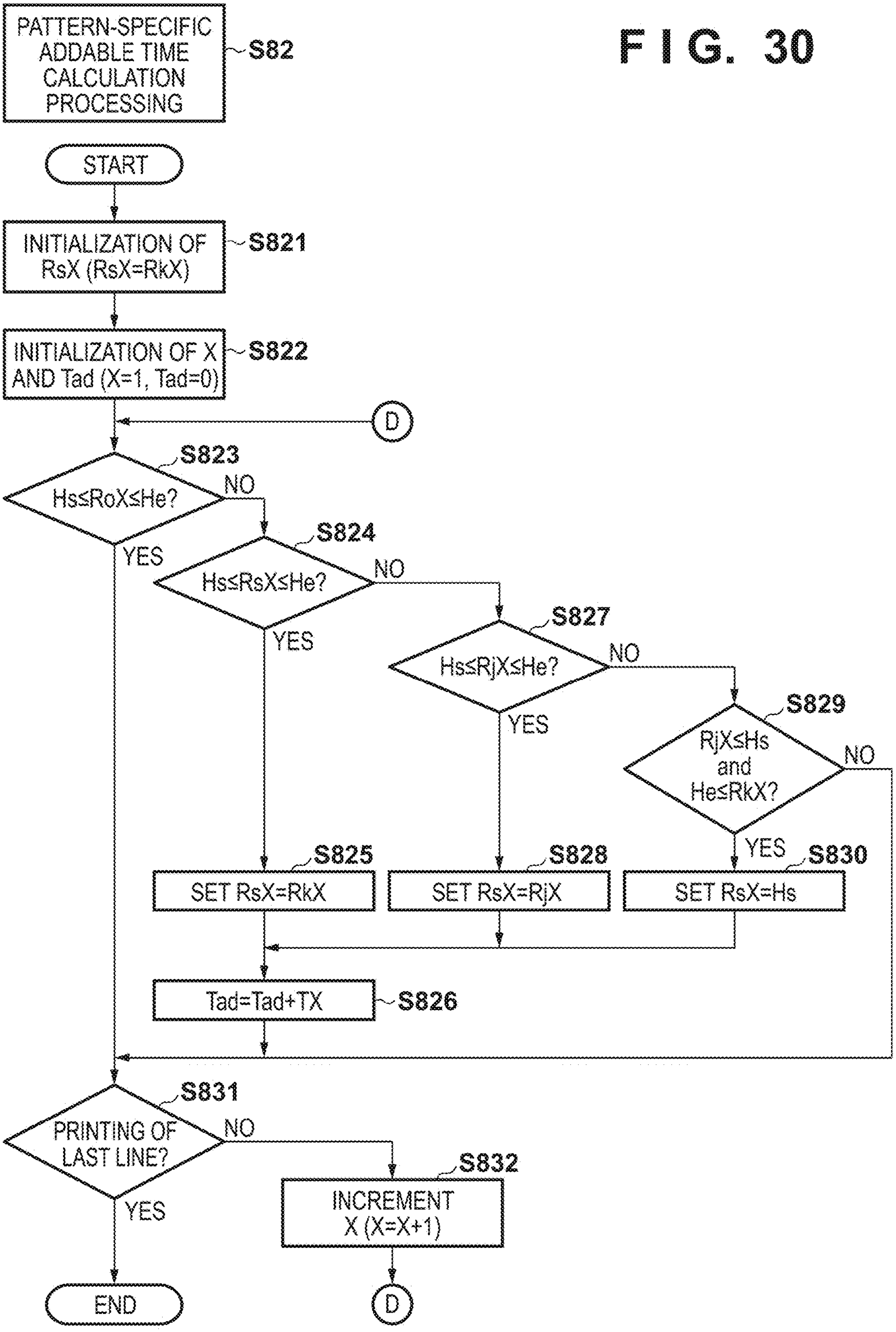
FIG. 30 is a flowchart showing an example of pattern-specific addable time calculation processing.

FIG. 30 is a flowchart showing an example of pattern-specific addable time calculation processing S82 as an alternative to additional time calculation processing S80.

FIGS. 31A to 31G are schematic top views for explaining some patterns to be referred to when executing pattern-specific addable time calculation processing S82. By specifying in advance one of reference patterns to which the relative positional relationship between elements based on print data corresponds, it is possible to determine whether scanning printing in the separation region Rh can be added by a nozzle shift operation, and calculate Tad and RsX with relative ease.

As shown in FIG. 31A, for given scanning printing, the nozzle 71 used for printing on a print region Kr can be adjusted within a range from a mode Nk in which the most downstream side is used to a mode Nj in which the most upstream side is used. In FIG. 31A, the position RkX corresponds to the nozzle position in a case where the most downstream side of the nozzle 71 is used, and the position RjX corresponds to the nozzle position in a case where the most downstream side of the nozzle 71 is used. Also shown are the above-described separation start position Hs (=W+Dr), separation end position He (=L−Dp+Dr), and common region Ak of the region between RjX and RkX and the region between Hs and He. If the common region Ak exists, scanning printing in the separation region Rh can be added by a nozzle shift operation. If the common region Ak does not exist, scanning printing in the separation region Rh cannot be added.

Here, considering RkX≥RjX and He≥Hs, the relative positional relationship among RkX, RjX, He, and Hs can be divided into the following six patterns:

- pattern where RjX>He (FIG. 31B);
- pattern where RkX>He and Hs≤RjX≤He (FIG. 31C);
- pattern where Hs≤RjX≤He and Hs≤RkX≤He (FIG. 31D);
- pattern where RjX<Hs and Hs≤RkX≤He (FIG. 31E);
- pattern where RkX<Hs (FIG. 31F); and
- pattern where RjX<Hs<RkX and RjX<He<RkX (FIG. 31G).

Based on these six patterns, it is determined in S823 to S830 (to be described later) whether scanning printing in the separation region Rh can be added by a nozzle shift operation. Focusing on the presence/absence of the common region Ak, among these six patterns, scanning printing in the separation region Rh cannot be added by a nozzle shift operation in the patterns shown in FIGS. 31B and 31F, and scanning printing in the separation region Rh can be added in the other patterns. Pattern-specific addable time calculation processing S82 will be described below with reference to FIG. 30.

In S821, for the Xth scanning, the above-described nozzle position RsX is initialized with the nozzle position RkX for performing scanning printing using the most downstream side of the nozzle 71, thereby setting RsX=RkX.

In S822, X is initialized as X=1, and the conveyance stop time Tad due to scanning printing added in the separation region Rh by a nozzle shift operation is initialized as Tad=0.

In S823, for the Xth scanning, it is determined whether Hs≤ROX≤He. If Hs≤ROX≤He (YES in the determination), the process advances to S831; otherwise (NO in the determination), the process advances to S824. Note that in the pattern shown in FIG. 31D (the pattern where Hs≤RjX≤He and Hs≤RkX≤He), since RjX≤RoX≤RkX, it is determined that Hs≤RoX≤He (YES in the determination), and the process advances to S831.

In S824, for the Xth scanning, it is determined whether Hs≤RkX≤He. If Hs≤RkX≤He (YES in the determination, the pattern shown in FIG. 31E), the process advances to S825; otherwise (NO in the determination, the patterns shown in FIGS. 31B, 31C, 31F, and 31G), the process advances to S827.

In S825, RsX=RkX is set.

In S826, the conveyance stop time TX due to scanning printing of the Xth scanning is added to Tad.

In S827, for the Xth scanning, it is determined whether Hs≤RjX≤He. If Hs≤RjX≤He (YES in the determination, the pattern shown in FIG. 31C), the process advances to S828; otherwise (NO in the determination, the patterns shown in FIGS. 31B, 31F, and 31G), the process advances to S829.

In S828, RsX=RjX is set.

In S829, for the Xth scanning, it is determined whether RjX≤Hs and He≤RkX. If RjX≤Hs and He≤RkX (YES in the determination, the pattern shown in FIG. 31G), the process advances to S830; otherwise (NO in the determination, the patterns shown in FIGS. 31B and 31F), the process advances to S831.

In S830, RsX=Hs is set.

In S831, it is determined whether the Xth scanning is for printing of the last line on the succeeding print medium P. If the Xth scanning is for the last line (YES in the determination), this flowchart is terminated; otherwise (NO in the determination), the process advances to S811.

In S832, the parameter X is incremented (X=X+1), and the process returns to S823.

Referring to FIGS. 31B to 31G again, the above-described flowchart will be described.

The case of NO in the determination in S823 (Hs≤RoX≤He is not satisfied for the Xth scanning) corresponds to a case where scanning printing has not been performed in a separating operation in the initial state in which a nozzle shift operation is not performed. In the pattern shown in FIG. 31C where the common region Ak exists, it is determined in S824 that Hs≤RkX≤He is satisfied (YES in the determination in S824), and the conveyance stop time TX substantially corresponding to the scan time is added to the conveyance stop time Tad in S826. Note that, as shown in FIG. 31C, since the common region Ak is in the range from RjX to He, RsX=RkX is set in S825, but the common region Ak is not limited to this and may be set in a range of RjX≤RsX≤He.

Similarly, in the pattern shown in FIG. 31E where the common region Ak exists, it is determined in S827 that Hs≤RjX≤He is satisfied (YES in the determination in S827). In the pattern shown in FIG. 31G, it is determined in S829 that RjX≤Hs and He≤RkX are satisfied (YES in the determination in S829). In these cases, the process advances to a step for performing a nozzle shift operation. Note that in the pattern shown in FIG. 31E, the common region Ak is in the range of Hs to RkX, and in the pattern shown in FIG. 31G, the common region Ak is in the range of RjX to RkX. Hence, RsX=RkX is set in S825, but the present invention is not limited to this. For these cases, RsX and RkX may be set in the range of Hs≤RsX≤RkX and in the range of RjX≤RsX≤RkX.

Of the patterns shown in FIGS. 31B to 31G, the patterns shown in FIGS. 31B and 31F, where the common region Ak does not exist, correspond to a condition that scanning printing in the separation region Rh cannot be added by a nozzle shift operation. In these cases, it is determined in S829 that RjX≤Hs or He≤RkX is not satisfied (NO in the determination in S829), and the process is terminated without adding the conveyance stop time TX substantially corresponding to the scan time to the conveyance stop time Tad.

In the pattern shown in FIG. 31D, since Hs≤RkX≤He and Hs≤RjX≤He, Hs≤RoX≤He is always satisfied, and therefore it is determined in S823 that Hs≤RoX≤He is satisfied (YES in the determination in S823). In the pattern shown in FIG. 31D, since scanning printing has already been performed in a separating operation in the initial state in which a nozzle shift operation is not performed, the process is terminated without adding the conveyance stop time TX to the conveyance stop time Tad. Also in the patterns shown in FIGS. 31C, 31G, and 31E, if scanning printing has not been performed in a separating operation in the initial state, it is determined in S823 that Hs≤RoX≤He is satisfied (YES in the determination in S823), and the process is terminated without adding the conveyance stop time TX to the conveyance stop time Tad.

According to the pattern matching as described above, it is possible to relatively easily determine whether scanning printing in the separation region Rh can be added by a nozzle shift operation, and calculate Tad and RsX.

As has been described above, according to Examples 1 and 2, in the configuration capable of implementing successive overlapped conveyance so that the trailing end portion of the preceding print medium P1 overlaps the leading end portion of the succeeding print medium P2, the intermittent conveying operation and scanning printing operation are alternately repeated for the overlapping print media P1 and P2. When discharging the printed media, the conveyance rollers 10 and 20 and the like are driven so as to separate them from each other, and prior to this, a nozzle shift operation is performed to allow the conveying speed V2 to meet a criterion. According to the drive or control mode as described above, control of a separating operation can be properly implemented. With this, for example, the efficiency of printing processing can be improved by successive overlapped conveyance, and prevention of noise and reduction of power consumption can be achieved by a separating operation at the conveying speed V2 meeting a criterion.

<Program>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

<Others>

In the embodiments, individual elements are named by expressions based on their main functions. However, the functions described in the embodiments may be sub-functions, and the expressions are not strictly limited. Furthermore, the expressions can be replaced with similar expressions. In the same vein, an expression "unit (portion)" can be replaced with an expression "tool", "component", "member", "structure", "assembly", or the like. Alternatively, these may be omitted or added.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-108526, filed on Jun. 30, 2023, which is hereby incorporated by reference herein in its entirety.

What is claimed is:

1. A printing apparatus comprising:

a conveying unit configured to convey a print medium;

a printing unit including a printhead having a nozzle, and configured to perform scanning printing for performing printing on the print medium while scanning the printhead in a direction crossing a conveyance direction of the print medium; and a control unit configured to control the conveying unit and the printing unit so that conveyance of the print medium and scanning printing of the printhead are alternately performed, wherein the control unit performs first control of, while performing printing by the printing unit in a state in which a trailing end portion of a preceding print medium overlaps a leading end portion of a succeeding print medium, controlling the conveying unit to separate the preceding print medium and the succeeding print medium from each other and, in the first control, adjusts a conveyance amount by the conveying unit to allow a conveying speed by the conveying unit to meet a criterion and adjusts a driving range of the nozzle based on the adjusted conveyance amount.

2. The apparatus according to claim 1, wherein before the first control, the control unit performs second control of controlling the conveying unit so that the trailing end portion of the preceding print medium overlaps the leading end portion of the succeeding print medium during the printing unit performing printing on the preceding print medium.

3. The apparatus according to claim 1, wherein the conveying unit includes a first conveyance roller arranged on a downstream side of the printhead, and a second conveyance roller arranged on a downstream side of the first conveyance roller, and in the first control, the preceding print medium and the succeeding print medium are separated from each other by driving the first conveyance roller at a first conveying speed and driving the second conveyance roller at a second conveying speed higher than the first conveying speed.

4. The apparatus according to claim 1, wherein the control unit is capable of executing, instead of the first control, third control in which adjustment of the conveyance amount and adjustment of the driving range of the nozzle by the conveying unit are not performed, and in the third control, drives a most downstream side of the nozzle during scanning of the printhead, and in a case of performing the first control, drives an upstream side of the nozzle as compared to a case of performing the third control.

5. The apparatus according to claim 4, wherein in a case of performing the first control, the control unit specifies, with the driving range of the nozzle for performing the third control as an initial value, while gradually changing the initial value, a conveyance amount by the conveying unit for which the conveying speed by the conveying unit meets a criterion.

6. The apparatus according to claim 5, wherein if the conveyance amount by the conveying unit for which the conveying speed by the conveying unit meets a criterion cannot be specified, the control unit does not perform the first control.

7. The apparatus according to claim 1, wherein in the first control, the control unit adjusts a conveyance amount of the preceding print medium, and adjusts the driving range of the nozzle used for scanning printing on the preceding print medium.

8. The apparatus according to claim 7, wherein in the first control, the control unit adjusts the conveyance amount of the preceding print medium by the conveying unit during execution of scanning printing of a last line on the preceding print medium, and adjusts the driving range of the nozzle for performing scanning printing of a last line on the preceding print medium.

9. The apparatus according to claim 1, wherein in the first control, the control unit adjusts a conveyance amount of the succeeding print medium, and adjusts the driving range of the nozzle used for scanning printing on the succeeding print medium.

10. The apparatus according to claim 9, wherein in a case where a region from a position of a most downstream side of the nozzle in the succeeding print medium at a start of a separating operation of separating the preceding print medium and the succeeding print medium from each other to a position of the most downstream side of the nozzle in the succeeding print medium at an end of the separating operation is defined as a separation region, in the first control, the most downstream side of the nozzle is located in the separation region, and a most upstream side of the nozzle is located upstream of the separation region.

11. A computer-readable storage medium storing a program, the program configured to cause a computer to function as each unit of the printing apparatus according to claim 1.

* * * * *